United States Patent
Homyack et al.

(10) Patent No.: US 10,225,625 B2
(45) Date of Patent: Mar. 5, 2019

(54) CAPTION EXTRACTION AND ANALYSIS

(71) Applicant: Caption Colorado LLC, Greenwood Village, CO (US)

(72) Inventors: Michael W. Homyack, Highlands Ranch, CO (US); Richard T. Polumbus, Castle Rock, CO (US); Troy A. Greenwood, Centennial, CO (US)

(73) Assignee: VITAC Corporation, Greenwood Village, CO (US)

( * ) Notice: Subject to any disclaimer, the term of this patent is extended or adjusted under 35 U.S.C. 154(b) by 100 days.

(21) Appl. No.: 14/676,316

(22) Filed: Apr. 1, 2015

(65) Prior Publication Data

US 2015/0208139 A1 Jul. 23, 2015

Related U.S. Application Data

(63) Continuation-in-part of application No. 13/937,966, filed on Jul. 9, 2013, now abandoned, and a
(Continued)

(51) Int. Cl.
*H04N 21/8405* (2011.01)
*H04N 5/445* (2011.01)
(Continued)

(52) U.S. Cl.
CPC ....... *H04N 21/8405* (2013.01); *G06F 17/241* (2013.01); *G06F 17/2745* (2013.01);
(Continued)

(58) Field of Classification Search
CPC ... G06F 17/2775; G06F 17/278; H04N 21/84; H04N 21/8405
See application file for complete search history.

(56) References Cited

U.S. PATENT DOCUMENTS 5,508,754 A 4/1996 Orphan
5,805,153 A 9/1998 Nielsen
(Continued)

OTHER PUBLICATIONS

United States Government, "Closed Caption Decoder Requirements," Code of Federal Regulations 47 CFR 15.119, revised Oct. 1, 2000, pp. 704-714, vol. 1, Parts 0 to 19.
(Continued)

*Primary Examiner* — Michael N Opsasnick
(74) *Attorney, Agent, or Firm* — Dorsey & Whitney LLP

(57) ABSTRACT

Methods and systems are disclosed for real-time metatagging and captioning of an event and caption extraction and analysis for such event. The method for the real-time metatagging and captioning and caption extraction and analysis of an event may include embedding metatag information in a caption file provided by a captioner. The embedded and/or extracted metatag information may allow a user to access additional information via the text of the captioned event. Data, words, or phrases can be provided by the captioner during captioning or, post-captioning, extracted from the one or more segments of the caption transcript. Metadata based on said providing and/or extracting is provided. The metadata is stored in a metadata archive, where the metadata is associated with the caption transcript.

16 Claims, 10 Drawing Sheets

Related U.S. Application Data continuation-in-part of application No. 12/429,808, filed on Apr. 24, 2009, now Pat. No. 9,245,017.

(60) Provisional application No. 61/669,536, filed on Jul. 9, 2012, provisional application No. 61/166,963, filed on Apr. 6, 2009.

(51) Int. Cl.

| | | |
|---|---|---|
| *H04N 7/088* | (2006.01) | |
| *H04N 21/433* | (2011.01) | |
| *H04N 21/466* | (2011.01) | |
| *H04N 21/482* | (2011.01) | |
| *H04N 21/488* | (2011.01) | |
| *H04N 21/81* | (2011.01) | |
| *H04N 21/845* | (2011.01) | |
| *G06F 17/27* | (2006.01) | |
| *H04N 21/431* | (2011.01) | |
| *H04N 21/84* | (2011.01) | |
| *H04N 21/2187* | (2011.01) | |
| *H04N 21/235* | (2011.01) | |
| *G06F 17/24* | (2006.01) | |

(52) U.S. Cl.
CPC ......... *G06F 17/2785* (2013.01); *H04N 5/445* (2013.01); *H04N 5/44508* (2013.01); *H04N 7/0885* (2013.01); *H04N 21/2187* (2013.01); *H04N 21/2353* (2013.01); *H04N 21/4312* (2013.01); *H04N 21/4316* (2013.01); *H04N 21/4332* (2013.01); *H04N 21/4668* (2013.01); *H04N 21/4826* (2013.01); *H04N 21/4828* (2013.01); *H04N 21/4884* (2013.01); *H04N 21/812* (2013.01); *H04N 21/8133* (2013.01); *H04N 21/84* (2013.01); *H04N 21/8456* (2013.01)

(56) References Cited

U.S. PATENT DOCUMENTS

| | | | |
|---|---|---|---|
| 5,835,667 A | 11/1998 | Wactlar et al. | |
| 6,473,778 B1 | 10/2002 | Gibbon | |
| 6,637,032 B1 | 10/2003 | Feinleib | |
| 7,047,191 B2 | 5/2006 | Lange et al. | |
| 7,050,109 B2 | 5/2006 | Safadi et al. | |
| 7,861,275 B1 | 12/2010 | Vellaikal et al. | |
| 8,522,267 B2 | 8/2013 | Lenzi et al. | |
| 8,707,381 B2 | 4/2014 | Polumbus et al. | |
| 9,245,017 B2 | 1/2016 | Polumbus et al. | |
| 9,576,581 B2 | 2/2017 | Polumbus et al. | |
| 2002/0075403 A1 | 6/2002 | Barone, Jr. et al. | |
| 2002/0087979 A1* | 7/2002 | Dudkiewicz | G06F 17/30017 725/34 |
| 2002/0196370 A1 | 12/2002 | Dagtas et al. | |
| 2003/0169366 A1 | 9/2003 | Lenzi et al. | |
| 2003/0172375 A1* | 9/2003 | Shaw | G06F 1/1626 725/9 |
| 2005/0172318 A1 | 8/2005 | Dudkiewicz et al. | |
| 2006/0020596 A1 | 1/2006 | Liu et al. | |
| 2006/0212897 A1* | 9/2006 | Li | H04H 60/58 725/32 |
| 2007/0011012 A1* | 1/2007 | Yurick | G10L 15/26 704/277 |
| 2007/0188374 A1 | 5/2007 | Wise et al. | |
| 2007/0214488 A1* | 9/2007 | Nguyen | G06F 17/30796 725/134 |
| 2008/0140385 A1* | 6/2008 | Mahajan | G06F 17/30787 704/9 |
| 2008/0144781 A1* | 6/2008 | Liebermann | G09B 21/001 379/52 |
| 2008/0177786 A1 | 7/2008 | Faisman et al. | |
| 2008/0204595 A1* | 8/2008 | Rathod | G06F 17/30796 348/465 |
| 2008/0252780 A1 | 10/2008 | Polumbus et al. | |
| 2009/0063279 A1* | 3/2009 | Ives | G06Q 30/0277 705/14.73 |
| 2009/0299748 A1 | 12/2009 | Basson et al. | |
| 2010/0242060 A1 | 9/2010 | Liu et al. | |
| 2010/0257212 A1 | 10/2010 | Polumbus et al. | |
| 2011/0087682 A1 | 4/2011 | Serjeantson et al. | |
| 2012/0023084 A1 | 1/2012 | Lalji et al. | |
| 2012/0117078 A1 | 5/2012 | Morton et al. | |
| 2012/0259845 A1 | 10/2012 | Matejka et al. | |
| 2014/0009677 A1 | 1/2014 | Polumbus et al. | |
| 2015/0237148 A1* | 8/2015 | Baudouin | H04L 67/146 709/219 |
| 2016/0112368 A1* | 4/2016 | Volach | H04W 4/21 709/223 |
| 2018/0012599 A1 | 1/2018 | Polumbus et al. | |

OTHER PUBLICATIONS

Cheetah Systems, "TurboCAT", Cheetah International, website, http://www.caption.com/English/Products/TubroCT/ TurboCAT.html., accessed Dec. 19, 2011, (13 pages).

Microsoft Corporation, "Understanding SAMI 1.0," published Oct. 2001, publication updated Feb. 2003 (16 pages).

\* cited by examiner

| PEOPLE | COUNTRY | STATES | CITIES | KEYWORDS | CONCEPTS |
|---|---|---|---|---|---|
| BRIAN | U.S. | WASHINGTON | NEW ORLEANS | NEW ORLEANS | 2005 ATLANTIC HURRICANE |
| ALBERT BRIAN | IRAQ | TEXAS | NEW YORK | FIVE YEARS | GEORGE W. BUSH |
| JIM CANTORE | PUERTO RICO | NORTH CAROLINA | LOS ANGELES | HURRICANE | HURRICANE KATRINA |
| PETE | AFGHANISTAN | COLORADO | NEW YORK | BRIAN | NBC NIGHTLY NEWS |
| ROGER CLEMENS | MEXICO | | SAN JUAN | NEW YORK | NEW ORLEANS |
| BRIAN WILLIAMS | | | DETROIT | PRESIDENT OBAMA | PRESIDENT OF THE UNTIED STATES |
| JAMIE | | | KANDAHAR | HURRICANE EARL | TROPICAL CYCLONE |
| BRIAN | | | TAMAULIPAS | THIS STORM | UNITED STATES |
| RAY NAGIN | | | | NIGHTLY NEWS | |
| BRIAN WILLIAMS | | | | BRIAN WILLIAMS | |
| ALBERT | | | | HURRICANE KATRINA | |
| | | | | WEATHER CHANNEL | |
| | | | | NBC NIGHTLY NEWS | |
| | | | | NORTH AND EAST | |
| | | | | PREMATURE BABY | |
| | | | | JIM CANTORE | |
| | | | | DRUGS | |
| | | | | NANCY SNYDERMAN | |
| | | | | NEW ENGLAND | |
| | | | | TWO WEEKS | |
| | | | | THIS ONE | |
| | | | | LABOR DAY | |
| | | | | PRESIDENT FELIPE CALDERON | |
| | | | | WEEKEND | |
| | | | | SAN JUAN PUERTO RICO | |
| | | | | RAY NAGIN | |
| | | | | HURRICANE EVACUATIONS | |
| | | | | LOS ANGELES | |
| | | | | NBC NEWS | |
| | | | | AMERICAN BORN | |

| KEY PHRASE | TYPE | WORD COUNT | LOCATION | OCCURRENCES | SCORE |
|---|---|---|---|---|---|
| "KYLE DYER" | WHO (MEDIA) | 2 | 19 | 1 | 12.13 |
| "TARHONDA THOMAS" | WHO (MEDIA) | 2 | 138 | 2 | 9.32 |
| "BODY WAS FOUND" | WHAT (CRIME) | 3 | 80 | 1 | 8.98 |
| "VICTIM'S BODY" | WHAT (CRIME) | 2 | 276 | 2 | 8.32 |
| "POLICE SPOKESPERSON" | WHO (GOVERNMENT) | 2 | 788 | 1 | 8.32 |
| "POLICE DEPARTMENT" | WHO (GOVERNMENT) | 2 | 825 | 1 | 8.32 |
| "WOMAN'S BODY" | WHAT (CRIME) | 2 | 509 | 1 | 7.32 |
| "CALLED 911" | WHAT (CRIME) | 2 | 602 | 1 | 7.32 |
| "AROUND 7:00" | WHEN (TIME) | 2 | 1818 | 1 | 7.32 |
| "MIDDLE AGE" | WHAT | 2 | 1012 | 1 | 6.32 |
| "DEVELOPING STORY" | FREQ | 2 | 46 | 1 | 5.45 |
| "CRIME SCENE" | WHAT (CRIME) | 2 | 447 | 1 | 5.32 |
| "SUSPECT" | WHO (CRIME) | 1 | 1906 | 1 | 4.50 |
| "WEST FOURTH" | WHERE | 2 | 190 | 1 | 4.32 |
| "STREET" | WHERE (STREET) | 1 | 1611 | 1 | 3.50 |
| "OFFICE BUILDING" | FREQ | 2 | 101 | 1 | 3.32 |
| "MOMENTS AGO" | FREQ | 2 | 470 | 1 | 3.32 |
| "CLEANING CREW" | FREQ | 2 | 536 | 1 | 3.32 |
| "ACTIVE INVESTIGATION" | FREQ | 2 | 762 | 1 | 3.32 |
| "INVESTIGATION SECURE" | FREQ | 2 | 944 | 1 | 3.32 |
| "NICER BUILDING" | FREQ | 2 | 1347 | 1 | 3.32 |
| "DOOR UNLOCKED" | FREQ | 2 | 1426 | 1 | 3.32 |
| "KILLED" | WHAT | 1 | 648 | 1 | 2.50 |
| "LAKEWOOD" | WHERE | 1 | 2014 | 1 | 2.50 |

CAPTION EXTRACTION AND ANALYSIS

CROSS-REFERENCE TO RELATED APPLICATIONS

This application is a continuation-in-part application of U.S. patent application Ser. No. 13/937,966, filed on Jul. 9, 2013, and entitled "Caption Extraction and Analysis," which claims the benefit of and priority to U.S. provisional patent application No. 61/669,536, filed on Jul. 9, 2012, and entitled "Caption Extraction and Analysis," each of which are hereby incorporated by reference in their entirety for all purposes.

Further, this application is a continuation-in-part application of U.S. patent application Ser. No. 12/429,808, filed on Apr. 24, 2009, and entitled "Metatagging of Captions," which claims the benefit of and priority to U.S. provisional patent application No. 61/166,963, filed on Apr. 6, 2009, and entitled "Metatagging of Captions," each of which are hereby incorporated by reference in their entirety for all purposes.

TECHNICAL FIELD

The technology described herein relates to caption extraction and analysis, and more specifically to systems and methods for utilizing metadata generated in response to caption extraction and analysis. Further, the present invention relates generally to metatagging, and more particularly to real-time metatagging of an audio steam, a video stream and/or a captioned event.

SUMMARY

Closed-captioning of television, radio, Internet, and other media programs is often provided in order for people with hearing impairments to understand the dialogue in a program. Live broadcasts—such as news programs, award shows, and sporting events—are frequently captioned in real time by transcriptionists or captioners watching a feed of the program and/or listening to an audio feed for the program (such as via a telephone or voice over Internet protocol connection) which may be a period of time (such as 4-6 seconds) ahead of the actual live broadcast. In other cases media programs, such as major movie releases, may be captioned "offline."

The captions from media programs may be used as searchable transcripts to help users find relevant content. For example, a year long collection of caption transcripts from a daily newscast can be searched for information about a current event (e.g., a natural disaster, a political election, etc.). However, such searching can be unwieldy for a number of reasons. For example, during a single newscast, dozens of different topics can be presented, and a search "hit" for a particular newscast's transcript may require a user to look through several irrelevant news stories before finding the news story of interest. As another example, a search for a particular search term may return many results that, though including the search term, are not particularly relevant to what the user was looking for (e.g., a search for "nuggets" may return results for chicken nuggets rather than a professional basketball team the user may be interested in). Furthermore, a user may miss entire newscasts if the terminology used in the newscast does not exactly match the search term used (e.g., a search for "intellectual property" may not return stories that specifically address patents, copyrights, and so forth).

The caption transcripts may also be difficult to search because, for example, they may be in a format (e.g., plain text file, or caption format file) that is not amenable to quick and efficient searching, and may not include information designed to enhance a user's experience while viewing a particular media program.

Many events, television programs, movies, live performances, courtroom activities, and so on, are transcribed, captioned or have associated text corresponding to the event. These captions and/or text may be produced and/or added to the event as it is ongoing or during a replay of the event. The caption and/or text may also be used later, either separately, played back, as a transcript or concurrently with associated video, to review the event. Captions and/or text are often useful, for example, when hearing-impaired individuals watch or participate in the event by an individual watching the event at a low or zero volume, or to clarify audio of the event. "Captions," as used herein, generally refer to a transcription or summation of an event or audio associated with the event, such as the words spoken during the event. In one example, "text" may be a caption.

Captions may be shown on various displays such as televisions, computing device (including handheld and portable computing devices), personal digital assistants ("PDAs"), mobile devices and so on. Although a user may have access to captions and/or text associated with video streams, as well as audio streams relating to or containing audio associated with an event, the user may desire additional information regarding the event or to review the text of specific portions of the event as the event continues to take place. The user may view the captioning text on the aforementioned displays, but may desire access to additional information regarding the event. Generally, the additional information may take a variety of forms, including personal information for individuals in the event, statistics associated with the event, participants therein, entities associated therewith, prior similar events, and so on. However, the user may not have real-time access to information associated with the event. Users may look up such information via the Internet, but this generally requires the user split his focus or concentration by either using a separate device for such research or momentarily ignoring the event to otherwise access the information through another function of the same device (for example, opening a second application on a computer).

Thus, a method of real-time metatagging of at least audio streams, video streams and/or events is desirable. Accordingly, there is a need in the art for an improved method for the real-time metatagging of audio streams, video streams and/or captioned events.

One embodiment takes the form of a method for providing information associated with an event in real-time (e.g., as the event takes place, or with a minimal delay, such as less than a minute) to a user. Generally, the information may include, but is not limited to, captions corresponding to the audio portion of the event, text that corresponds to the audio portion of the event, statistical information regarding the event, statistical information regarding the individuals participating in the event, video portions of the event, phrases, places and/or people associated with the event, specific occurrences in the event itself or any combination thereof. Additionally, captioning may describe audio content including verbal and non-verbal content may be a transcription corresponding to the audio portion of an event and may be formatted for display on a monitor such as a television screen or any type of device with a screen. Captioning may include changing the color, graphics or display of the captions to provide additional information and/or context of the caption, like whom is speaking, location of an event, location of a speaker and so on. In this embodiment, an event may be real-time captioned and metatagged and provided to a device. A user may view the text of the caption on the device (or an associated display) and may desire access to additional information associated with the event, as the event is taking place. As the user is viewing the text, the user may select a metatagged word, phrase, person or so on from the text, which may appear in a fashion similar to a hyper text markup language ("HTML") link. The user may access, via the metatagged caption text, the desired information. The user may access, for example, information regarding the event itself, phrases, places and/or people associated with the event, specific occurrences in the event itself or any combination thereof.

As one example, the event may be a sporting match and the user may select a metatagged caption to access statistical information regarding the performance of a player. Sample statistical information may include percentage of completed passes for a football game, runs batted in for a baseball game, average speed of a marathon runner, first serve percentage for a tennis player and so on. In another example, the user may additionally use the metatagged captions to access specific events in the football game such as touchdowns, beginning of quarters, half-time, interceptions and so on. It should be appreciated that the event may be a news broadcast, audiovisual program, live performance, telephone conference, or any other suitable event that is captioned in real-time or after the fact. The metatags and information accessed through the metatags may vary according to the nature of the event, its participants, its place and other factors.

In yet another example of an embodiment, a captioning system may provide a user with caption data or text that may be a real-time transcription of an event. As previously discussed, the user may view the text of the event as it takes place and may select the desired metatagged text which may appear as a link in the text. Such viewing may occur, for example on a handheld device such as any portable computing device, mobile phone, personal digital assistant ("PDA"), audio/visual media player and so on. The metatagged information may correspond to a word, person, phrase, subject matter, concept, related terms, references to other sources of similar terms, place, specific happening in the captioned event, time block in the captioned event and so on. For example, a time block may be the second quarter of a football game and a specific happening in the captioned event may be a touchdown in the second quarter. In one example, the user may be viewing text of a captioned Denver Broncos football game and may wish to view all the touchdowns the Denver Broncos have scored. To do so, the user may access the corresponding information via the metatagged text (for example, "touchdowns") in the captioned text and/or video/audio segment.

Another embodiment may take the form of a method for the real-time captioning and metatagging of an event. In this embodiment, data, such as an audio file, may be provided to a captioner who transcribes the event as it takes place and who creates a caption file. The captioner may create the caption file using a captioning device for transcribing the text and for embedding the metatag code in the text code of the caption file. Generally, any word, such as a phrase, place and/or name may be metatagged. Specific keystrokes or other entry methods on the captioning device may produce the text code for specific words, (which translates to text on a display) and may also embed the metatag codes corresponding to the specific words into the text code. For example, the keystroke to produce the text "John Elway" may also embed the metatag for "John Elway" in the text code. Additionally, a keystroke may be a specific metatag keystroke including the relevant metatagging information for the corresponding word and/or phrase. The keystrokes may be defined by the captioner in a dictionary created by the captioner, or the captioning device may include keystrokes with pre-defined metatags for specific words, people, phrases, subject matter, concepts, related terms, references to other sources of similar terms, places, specific happenings in the captioned event, time block in the captioned event and so on, or the captioning and/or metatagging keystroke may reference a database that may include the aforementioned pre-defined metatags and/or captions. Certain embodiments may employ more than one of the foregoing ways for defining keystrokes. Metatagging may be performed in various ways such as using a live captioner as described above, by a later captioner/editor and/or by a live editor. The different metatagging methods will be discussed in further detail below.

Continuing the description of the embodiment, the caption file may be provided to a caption system, such as the Bison Interactive Captioning Console ("BICC"). BICC may, among other functions, format the caption file, so that the caption file may be compatible with end users such as programming providers. BICC may also prepare a formatted first caption file for transmission as a live text stream by stripping out the metatag information. Additionally, BICC may transmit a second formatted caption file to an archive system for further formatting, including time-coding and metatagging. BICC will be discussed in more detail below and is also discussed in nonprovisional application Ser. No. 10/094,689, titled "METHOD AND APPARATUS FOR CONTROL OF CLOSED CAPTIONING" and filed on Mar. 8, 2002, which is incorporated herein in its entirety by reference. It should be understood and appreciated that any suitable captioning system may perform any of the functions described herein with reference to BICC. Accordingly, it is to be appreciated that BICC is illustrative in this description; other captioning systems may be employed, optionally with suitable alterations to the system to permit, for example, the insertion of metatags, connection to a network such as the Internet or any other suitable network, and so on.

In another embodiment, the captioning device may not embed the metatag code in the caption file. The caption file may still be transmitted to BICC and then after formatting may be transmitted from BICC to an editing system. The editing system may edit the caption file for grammar and spelling and may additionally, insert time codes and metatags. Words, people, phrases, subject matter, concepts, related terms, references to other sources of similar terms, places, specific happenings in the captioned event, time block in the captioned event and so on, may be identified by the editing system which may insert the corresponding metatags. Additionally, the editing system may insert time codes that may be used for indexing the edited caption file to an audio, video or audiovisual file.

In yet another embodiment, a system may provide a first stream which may be a caption stream and a second stream which may be a metatag stream. In this embodiment, the first caption stream may be provided to a user interested in viewing the text of the captioned event. The second metatag stream may be provided to a user interested in searching for additional information regarding the event and/or participants in the events, instant replays, keyword lookups, alerting and so on. Additionally, the first caption stream may also be metatagged by the system to provide a third metatagged caption stream.

It should be noted that embodiments discussed herein may be used in a variety of captioning systems and video and/or audio systems. The embodiments may include or work with a variety of display components, audio and/or video components, monitors, screens, images, computing devices, portable computing devices and electrical devices. Aspects of the various embodiments discussed herein may be used with practically any apparatus related to video and/or audio devices, display systems or any apparatus that may contain any type of display and/or audio system. Accordingly, embodiments may be employed in computing systems, portable computing systems and devices used in audio and/or visual events and peripherals and so on.

Before explaining the disclosed embodiments in detail, it should be understood that the invention is not limited in its application to the details of the particular arrangements shown, because the invention is capable of other embodiments. Also, the terminology used herein is for the purpose of description and not of limitation.

One embodiment described herein may take the form of a method for metatagging an event. A first device, such as a captioning system, may receive at least a first set of audio and/or video data of the event while the event is occurring. The first device may generate a text file including both text and metatag codes, from the first set of audio and/or video data, by employing keystrokes on the first device that produce both text and metatag codes. A second device may receive the text file and may format the text file to generate a caption file. The second device may generate a stripped caption file by stripping the metatag code from the caption file and may also transmit the stripped caption file as a live text stream.

Another embodiment described herewith may take the form of a method for creating a metatagged file. A captioning device may receive a text file and may generate a caption file at the captioning device by employing keystrokes on the captioning device to embed metatags in the caption file. Automated search capability may also be used to identify information for metatagging and to automatically embed meta tags without employing keystrokes. The captioning device may transmit the caption file as a live text stream with embedded metatags. Additionally, the captioning device may transmit the caption file and video data to an archive system which may index the caption file to the video data by time stamping the caption file.

Yet another embodiment described herewith may take the form of a system for creating a metatagged caption file. The system may include a caption device and a captioning system. The caption device may be configured to receive at least a first set of audio and/or video data of an event at the caption device while the event is occurring and may be further configured to produce text and metatag codes using the same keystroke and/or automated search and to generate a text file. The captioning system may be configured to receive the text file and to generate a caption file by formatting the text file. The system may also include an editing system and an archive system. The editing system may be configured to edit the caption file, strip the metatag codes from the caption file, add metatag codes to the caption file and index the caption file to at least one of video data or audio data. The archive system may be configured to receive the caption file, receive at least one of video data or audio data and index the caption file to at least one of the video data or audio data.

Before explaining the disclosed embodiments in detail, it should be understood that the invention is not limited in its application to the details of the particular arrangements shown, because the invention is capable of other embodiments. Also, the terminology used herein is for the purpose of description and not of limitation.

BRIEF DESCRIPTION OF THE DRAWINGS

FIG. 4 is a table listing information that may be extracted from a caption transcript using the caption extraction and analysis system shown in FIG. 1

FIG. 6 is a table listing key phrases extracted from a caption transcript using the method shown in FIG. 5.

DETAILED DESCRIPTION

Operating Environment

Figure 8:
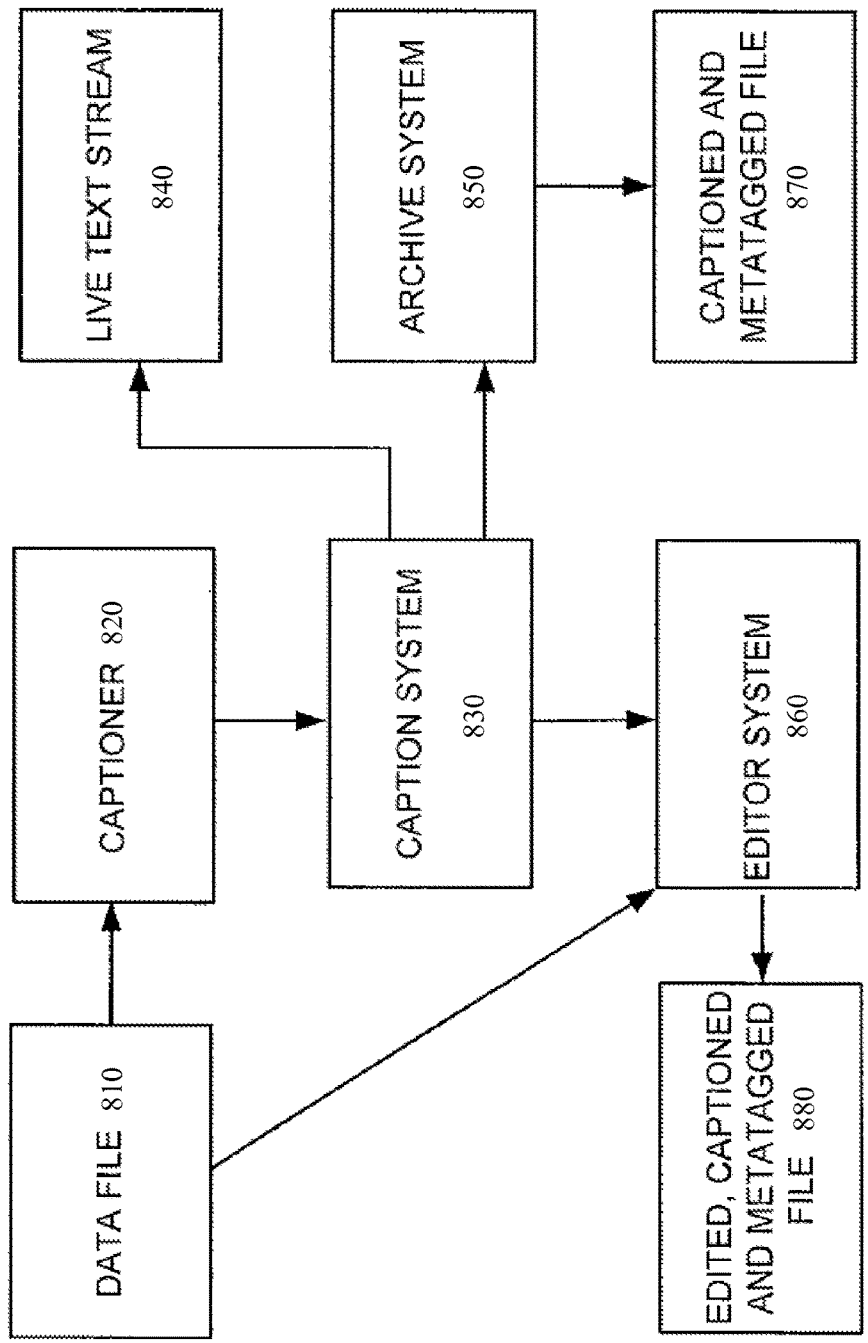
FIG. 8 depicts an embodiment of a captioning and metatagging system.

FIG. 8 depicts an embodiment of a captioning configuration 800 that may be used for real-time captioning and metatagging of an event. Generally, the captioning configuration 800 may operate across a network which may include the Internet, Ethernet, local-area networks, wide-area networks, wired networks, wireless networks (including infrared, radio frequency and Bluetooth networks and analog and digital spectrum), and so forth. Additionally, in practical application, the network may be composed of multiple sub-networks, each of which may be of any type previously mentioned.

As shown in FIG. 8, a data file 810 may be provided to a captioner 820. The file may be a real-time or pre-recorded audio and/or video file, containing data corresponding to an event, such as a television program, movie, live performance, courtroom activity, sporting event and so on. Generally, captioning and/or text data (or an input containing captioning and/or text data) may be received either directly from a person or entity creating captions ("captioner") or from a database, server, computing device, or computer-readable medium. The term "captioner" may be used herein to refer to either a person or an entity creating captions. The captioner 820 may receive an audio and/or visual file as the event is taking place or after the event took place, but need not receive the video information associated with the file. In one example, the captioner 820 may transcribe the audio file 810 using a captioning device (not shown). The captioner may generate caption content and/or a data file using a captioning device and substantially in real-time that transcribes the audio portion for the event as it occurs.

The caption content may be, for example, a stream or set of captions to accompany television programming or another event such as a live event, a conference (whether in person or via telephone or other electronic device), a record of a conversation or proceeding (such as might be generated by a court reporter or a stenographer), a record of a written document, and so on. Generally, real-time or non-real-time resources such as recorded media, recorded video and/or audio, recorded events, books, documents and so on, may be captioned. The term "event," as used herein, is intended to cover all of these examples as well as any other proceeding, display, or activity that may be captioned or transcribed. Likewise, where the event is recorded by a stenographer, court reporter, voice writer or the like, the notes, record or stream of information is additionally considered to be a "caption" as used herein.

The caption content and/or data file may be transmitted from the captioner 820 to a caption system 830 such as the Bison Interactive Captioning Console ("BICC") or other suitable captioning system. The data file may be transmitted across the network 805 (or another network) or placed on a computer-readable medium accessed by the captioning system 830, which may include a local or remote caption encoder (not shown). Captioning system 830 may format the data file into an appropriate format for the receiver. For example, the data file may be formatted into a caption file so that it complies with a closed captioning standard such as EIA-608, generally referred to as line 21 captioning. By formatting the data file, it may be made compatible for receipt and/or processing by various devices such as television receivers, handheld computing devices and so on.

In FIG. 8, the caption system 830 may receive data files including text information, captioning information, metatagging information, time stamps and/or any combination thereof. Thus, data files may be referred to herein as a general file that may be a file including various types of information such as text, captioning information, metatagging information, time stamps and/or any combination thereof. The data files provided by the captioner 820 typically take the form of text of the captioned event and may or may not include captioning information, metadata that allows a user to access additional information regarding the captioned event or any combination thereof. "Captioning information" or "captions" may include text as well as other data that additionally describes the event such as identification of speakers, indication of laughing and/or music, formatting information so that the text may be displayed on video screens (which may not be shown on an end display), carets or other indicators of pauses, changes between speakers, and so on. Generally and as discussed herein, data files including text information (as opposed to captioning information) may allow a user to view the text of the event and may not include captioning information. Additionally, the captioning system may receive captioning and/or text data (or an input containing captioning and/or text data) either directly from the person or entity creating captions or from a database, server, computing device, or computer-readable medium. For example, the captioning and/or text data may be stored as part of a computer readable file and transmitted across a network to the embodiment from a server, captioner or captioning device.

A suitable captioning system may perform a number of functions such as formatting and stripping information from data files for receipt and/or processing by another device. For example, the captioning system may be formatted to comply with a closed captioning standard such as EIA-608 and transmit various types of data files all of which may generally include at least two types of information regarding the captioned event. One type of data file may be a caption file, which may be transmitted from BICC as a live text stream 840. the captioning system may add the caption file to, or multiplex the caption file with, a media stream (such as video intended for broadcast) and transmit the formatted caption file to one or more viewers. In one example, the caption file may appear as text displayed on a screen corresponding to the audio of a program displayed on the screen. Similar to data files, caption files may include text information, metatagging information, time stamps, and formatting.

Continuing this example, the caption file may include text corresponding to the audio of the captioned event. Accordingly, in the event the caption file includes metatag information, the captioning system may strip out the metatag information before transmitting the caption file as the live text stream 840. Formatting and stripping the caption file of metatags will be discussed in further detail below. Certain embodiments may leave the metatag information in the live text stream or may transmit a second live text stream including metatag information. This may be used, for example, when the live text stream is received by a device capable of recognizing and/or processing metatags.

Figure 1:
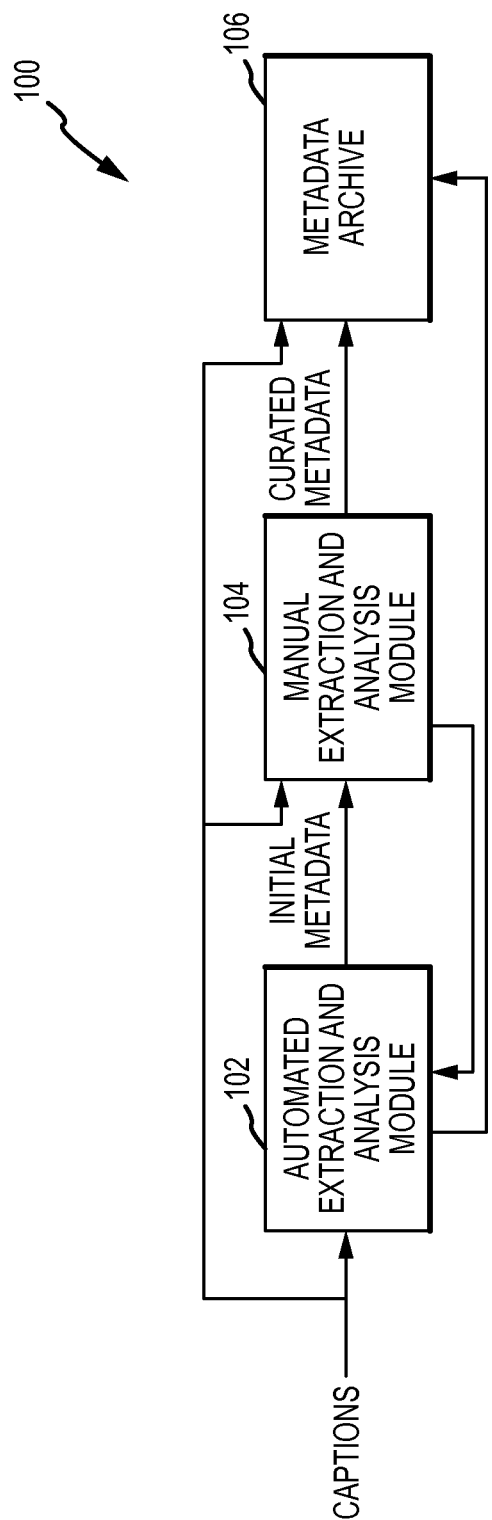
FIG. 1 is a block diagram of caption extraction and analysis system.

A second type of caption file may be transmitted from the caption system 830 to an archive system 850, which may generate a captioned metatagged file 870. The archive system may include a metadata archive 106, as shown in FIG. 1 and discussed below. The captioned metatagged file may include text and may also include metatag information, which may be embedded in the caption file by the captioner 820. In this case, the captioning system may format the caption file so that it may be compatible for receipt by the archive system 850. The archive system 850 may store the caption file with the accompanying video file which may be used to further index the file with time stamps, for example, that correspond to the video. This index file (e.g., the stored caption file, with or without the accompanying video file) may include metatags, caption data, text data, or any combination of the above. Further, any of the foregoing may be omitted. It should be noted that the archive system, as well as the captioned metatagged file and the index file, are optional and may be omitted in certain embodiments. The live text stream 840 may also be archived by the archive system and, in certain embodiments, may be the base file used by the archive system and/or editor system to produce either or both of one or more edited, captioned and metatagged files 880 and/or one or more captioned and metatagged files 870.

Additionally, the captioning system may transmit a caption file to an editing system 860. The editing system 860 may be used by an editor to edit the caption file, thereby producing an edited, captioned and metatagged file 880. In one example, the caption file provided to the editing system 860 may be the live text stream file 840. The user of the editing system 860 may edit the live text stream file, correct any spelling mistakes, add additional time codes/stamps and add additional metatags. Similar to the captioned and metatagged file 870 produced by the archive system 850, the editing system 860 may provide an edited, captioned and metatagged file 880. The editing system 860 may be omitted from the captioning configuration 800 in certain embodiments.

Captioning and Metatagging the Data File

The caption file may be a real-time transcription of an event, provide text and captioning information that corresponds to the audio of the event and include information such as time stamps. The caption data may be separated into text blocks each containing either a set number of words or all words captioned during a particular time period. For example, the caption data may be segmented into fifty word blocks or into thirty second blocks. Blocks may also include the date and time, down to fractions of seconds, at which each block starts and ends. The various operations discussed herein may access the caption data in increments of one or more blocks.

For example, time stamps may mark the captions in the caption file every three seconds or every thirty-two characters or every word and may cross-reference the captions to the audio of the event. Generally, the first time stamp in the caption file may be manually and/or automatically synchronized to the audio of the event such that the subsequent time stamps of the caption match the audio of the event. By cross-referencing the text of the caption file to the audio corresponding to the event, it may be possible to access specific portions of the event by accessing the time stamp associated with the text of the caption file.

The captioner 820 may use pre-defined keystrokes or voice commands that correspond to words, phrases, names and so on, when generating the caption file from the audio file 810. Generally, words, phrases, names and so on may be programmed as specific keystrokes (including combinations of keystrokes) on the captioning device. Certain common groups of letters, either words and/or phrases, may be mapped to a single keystroke. This, in turn, may permit the captioner to use fewer keystrokes to spell commonly used, long and/or complex terms and/or names during captioning of the event. For example, a football player's name may have a long and/or complex spelling. By assigning the football player's name to certain keystrokes on the captioning device, the captioner may prevent misspelling the football player's name and may be faster when transcribing the words spoken during the football game. Such shortcut keystrokes may be previously defined by the captioner 820 and stored in a dictionary. The dictionary may be a file associated with the captioning device and may be stored on the captioning device, on a database, server, computing device, or other computer-readable medium and accessed across a network, or as otherwise described herein.

The keystrokes may provide information in addition to the spelling of a word, phrase and/or name in the caption file. The keystrokes may also provide embedded metatag codes in the text code of the caption file that may allow a user to link to additional information pertaining to the captioned event. Automated search capability may also be used to identify information for metatagging and to automatically embed meta tags without employing keystrokes. In one example, the keystroke may provide the spelling of the football player's name, but may also provide an embedded metatag code that allows the user to access additional information regarding the football player such as performance statistics for the game, general information such as height, weight and so on, or may allow the user to jump to specific plays the football player participated in. Additional detail of how the metatags may be constructed and linked to the audio file will be discussed in further detail below.

Although the information associated with the keystrokes (or other entry methods such as a mouse, voice commands, and so on) may vary, the keystrokes may remain the same to the captioner. Stated differently, the captioner may use the same keystrokes for previously programmed words, but the information associated with the keystrokes may be different. From the captioner's perspective, the keystrokes may remain the same for a word or name whether they include metatagging information, spelling information or a combination of both. Thus, a captioner used to particular keystrokes used on a captioning system that does not include metatag functionality may continue to use those same keystrokes with an embodiment described herein. The keystroke may, however, add a metatag as desired (or may not, if none is desired or the use of a metatag is inappropriate with a particular keystroke). The incorporation of metatag code into the text code of the caption file will be discussed in further detail below.

Additionally, in another example, the captioner 820 may generate the caption file from the audio file 810 by employing a voice writer. Generally, the voice writer may use voice recognition to create the caption file instead of and/or in addition to using keystrokes for captioning. In yet another example, the captioner 820 may be a person and may use the voice writer for some of the captioning. Thus, the captioner 820 may be able to use their hands to additionally caption some of the data manually using keystrokes on the captioning machine.

Generally, metatags may be inserted by the captioner 820, caption system 830, editor system 860, archive system 850, automated extraction and analysis module 102 (as describe below, and/or manual extraction and analysis module 104 (as described below). For example, the caption system 830 may be a computing device programmed, among other functions to recognize certain terms, words, and/or phrases ("text input") and insert or otherwise link a metatag to the recognized text input. The same is true of the editor system and/or archive system. Thus, certain embodiments may permit the captioner 820 to operate in a manner consistent with prior captioning machines, processes and procedures while the metatags are later inserted.

It should be noted that the metatags may include particular information such as a link to a World Wide Web site, Internet address or other repository of computer-accessible information (collectively, "archive site"). Thus, a user may access the archive site via the metatag in order to obtain more information about the text input or information associated with the text input. Information from the archive site may be displayed on the same device that displays the captions, either in a separate portion of the screen or the same area in which captions are displayed. Caption display may continue or may be halted while the user accesses or reviews information from the archive site.

Figure 10:
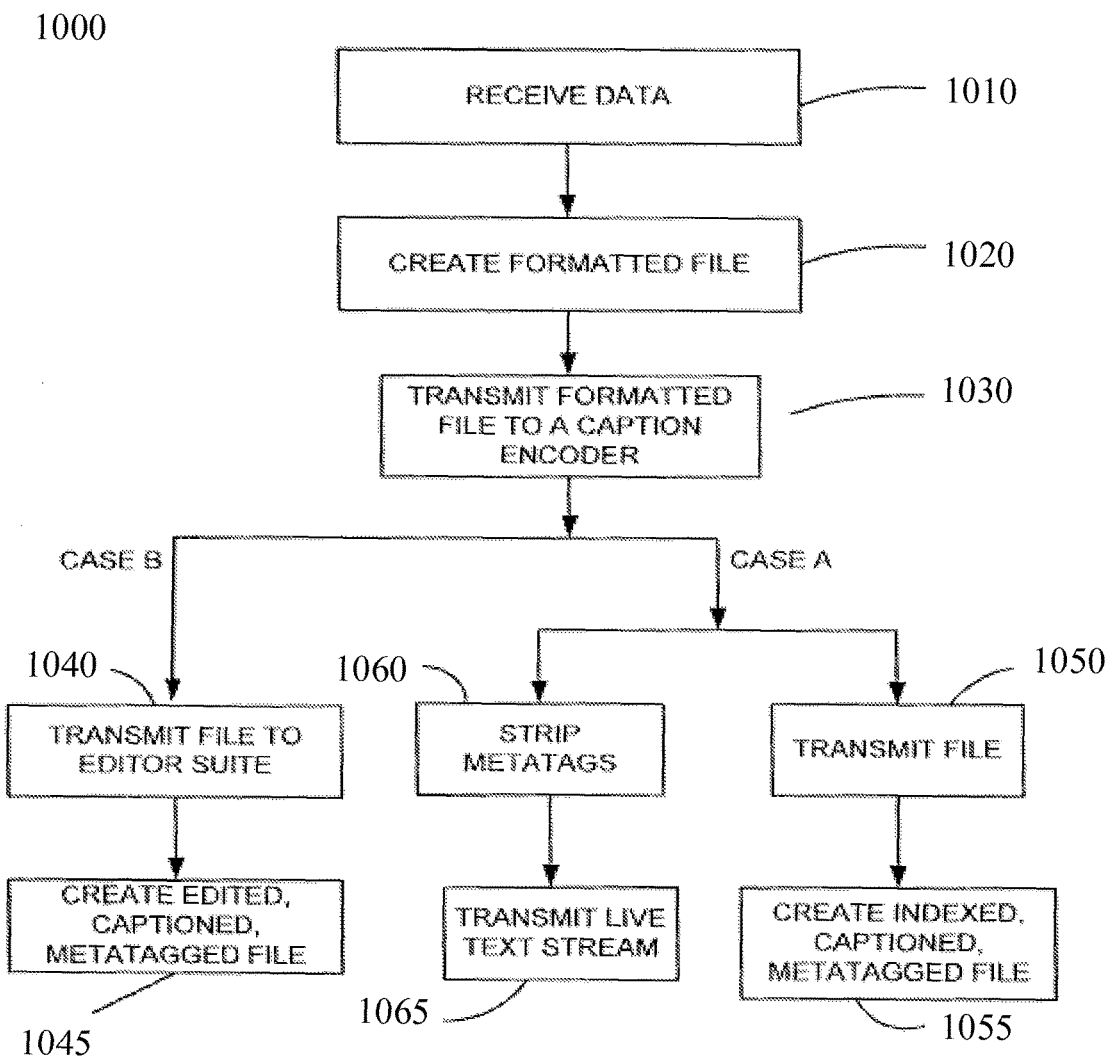
FIG. 10 is a flowchart depicting a sample method for inserting metatags into a caption stream associated with a captioned event.

FIG. 10 is a flowchart generally describing one embodiment of a method for the real-time metatagging. In operation 1010, a captioner may receive data. The data may be an audio or an audiovisual file corresponding to a real-time event and may be received by the captioner in various ways, such as, but not limited to, a streaming data file that is transmitted as the event occurs. The data file may be received by the captioner via a network as previously discussed. For example, the captioner may receive an audio file for a television program that is airing. Additionally, the data may be received by the captioner who may be present at the event. For example, the captioner may be present at a football game and may caption the football announcers commentating over the public announcement system at the football game. In one embodiment, the data file may be a text file that does not include captioning information. In this embodiment, the data file may be later metatagged and/or captioned as discussed in operation 1020. Generally, the data file may be a video and/or audio file, a text file that may include captioning information and/or metatagging information or any combination thereof.

In operation 1020, a formatted file may be created by the captioner employing a captioning device. Similar to the discussion of FIG. 8, the captioner may transcribe an event using the captioning device. The text may be transmitted as it is generated, to a central server for redistribution and may also be stored as a file. The formatted file may be stored locally to the captioning device and/or the captioner and then transmitted once completed, may be stored remotely on a server as the captioner transcribes the event, or any combination thereof.

The captioning device may allow the captioner to use programmed keystrokes or other entry methods to generate text for commonly used, long and/or complex terms and/or names. Additionally, the keystrokes may include metatagging information associated with the terms and/or names. For example, a specific keystroke may generate the text for a name, but may also embed code for a metatag that corresponds to the name. In order to produce a term and/or name, the keystroke may remain the same on the captioning device whether the metatagging information is included in the text or not. However, the code that corresponds to the term and/or name as defined on the captioning device may change. Continuing the above example, the name as it appears in the caption may be marked in the caption, so that a user may know that by selecting the name, additional information may be accessed. Although the metatagging information may be included in the formatted file in operation 1020, metatagging the formatted file may be performed in various ways as discussed below.

In another embodiment, the captioner may use the captioning device to metatag the formatted file instead of captioning the file. In this embodiment, upon receipt by the captioner in operation 1010, the original data file may be a text file with no captioning information. As previously discussed, the captioner may use programmed keystrokes on the captioning device to metatag the data file. However, in this embodiment, the programmed keystrokes may include metatagging information and no captioning information. Continuing this embodiment, the captioner may generate a stream with metatag information embedded in the text information.

In another example of this embodiment, multiple streams may be produced by the captioner. In this example, the captioning device may produce multiple streams, in which each stream may have different embedded information. For example, a first stream may be generated that includes text and metatagging information, a second stream may be generated that includes text and captioning information and a third stream may be generated that has text, metatagging and captioning information.

In operation 1030, the formatted file may be transmitted to a caption system which may further format the formatted file so that it may be compatible for end users including, but not limited to, cable, satellite and broadcast programming providers, Internet providers and so on. The caption encoder may also insert or otherwise format metatags, generally as discussed herein. In Case A, the formatted file may include metatags and may proceed to either of operations 350 and/or 360, or both. In Case B, the formatted file may not include metatags and will be discussed in detail below. Generally, but not necessarily, these cases are exclusive.

Returning to Case A of FIG. 10, in operation 1060, the caption system may strip or remove the metatags from the formatted file and in operation 1065, the stripped file may be transmitted as a live text stream to an end user. The stripped file may or may not include captioning information. Continuing the discussion of Case A, in operation 1050 (which may be performed concurrently with operation 1060), the formatted file may be transmitted to an archive system. In operation 1055, the formatted file may be time-coded and metatagged and indexed to a video file. Although the formatted file may already include time-codes, additional time-codes may be included in the formatted file so that the formatted file may be indexed to the video file. Likewise, the formatted file may have existing metatags that were embedded by the captioner in operation 1020, but additional metatags may be incorporated into the formatted file. Operations 1060 and 1065 may occur simultaneously with, before or after operations 1050 and 1055, or may be interleaved therewith.

Turning to Case B of FIG. 10, the formatted file may not include metatags. That is, in operation 1020, when creating the formatted file, the captioner may not have embedded metatags in the formatted file. In operation 1040, the formatted file may be transmitted from the caption system to an editing system. The editing system may receive the formatted file and may also receive the data file of operation 1010 and may include another captioner. In operation 1045, the editing system may edit the existing formatted file by comparing the formatted file to the original data file of operation 1010. Additionally, in operation 1045, the editing system may add further time-codes to the formatted file. Similar to previously discussed operation 1065, the formatted file may be time-coded, but the editing system may insert additional time codes. For example, before the additional time codes are inserted in operation 1065, the formatted file may include time stamps every three seconds or thirty-two characters. In operation 1045, time stamps may be inserted for each line of captioning. Further, the operation 1045 may create a series of time blocks, each of a fixed length, and containing or associated with captions occurring within each such time block.

As an example of such time-coding, presume a captioned event such as a television program is thirty minutes long and each time block is fifteen seconds long. The television program may include 120 separate time blocks and each time block may be associated with all captions occurring during the time block. Thus, the first time block may include or be associated with all captions occurring in the first fifteen seconds of the show. Likewise, the fiftieth time block may include or be associated with all captions occurring between twelve minutes and thirty seconds and twelve minutes and forty-five seconds from the beginning of the television program. In alternative embodiments, the blocks may be of variable length. As one non-limiting example, each block may contain a specific number of words, sentences, captions and so forth.

In operation 1045, the formatted file may also be metatagged. The editing system may metatag the formatted file by identifying relevant words and inserting the metatag codes so that when the word is selected by a user, the correct data and/or action is associated with the word. The data may specify data pertaining to the word and the action may direct the user to the desired portion of text.

Additionally, it should be noted that one or more of operations 1010 to 1065 of FIG. 10 may be omitted in alternative embodiments of the invention. For example, an alternative embodiment may not include an editing system, thus removing operations 1040 and 1045. Similarly, the order in which the operations displayed in FIG. 10 are executed may be varied in alternative embodiments.

FIG. 1 illustrates an embodiment of a caption extraction and analysis system 100. The caption extraction and analysis system 100 may include an automated extraction and analysis module 102 and/or a manual extraction and analysis module 104, as described in more detail below. The caption extraction and analysis system 100 may also include a metadata archive 106 that may be used for searching for relevant media programs. The system 100 may be provided in conjunction with or separate from the captioning system 830, archive system 850 and/or the editor system 860 and used by a captioner 820, editor, archiver or otherwise.

As illustrated in FIG. 1, captions may be provided to the automated extraction and analysis module 102 in the form of caption transcripts. In some embodiments, however, no automated extraction and analysis module 102 may be present, and in these embodiments, the caption transcripts may be provided to the manual extraction and analysis module 104. In still other embodiments, no manual extraction and analysis module 104 may be present, and in these embodiments, metadata (described in more detail below) may be provided from the automated extraction and analysis module 102 to a metadata archive 106. For convenience and clarity of description, the present disclosure will describe a caption extraction and analysis system 100 with both an automated extraction and analysis module 102 and a manual extraction and analysis module, although it is contemplated that a caption extraction and analysis system 100 may include only one or the other.

Returning to FIG. 1, initial metadata may be provided from the automated extraction and analysis module 102 to the manual extraction and analysis module 104. Furthermore, in some embodiments, caption transcript(s) may be provided to the manual extraction and analysis module 104. The initial metadata from the automated extraction and analysis module 102 and/or the curated metadata from the manual extraction and analysis module 104 may be provided to the metadata archive 106, and in some embodiments, the caption transcript(s) may also be provided to the metadata archive 106.

The caption transcripts provided to the automated extraction and analysis module 102 and/or to the manual extraction and analysis module 104 may be "synced" or "unsynced." Synced caption transcripts may be provided by a synchronization system, such as that described for example in U.S. patent application Ser. No. 12/886,769 filed on Sep. 21, 2010 and entitled "Caption and/or Metadata Synchronization for Replay of Previously or Simultaneously Recorded Live Programs," the entire contents of which are hereby incorporated by reference herein for all purposes. The caption transcript(s) may be synced to a media program, for example, in that the text of the caption transcript(s) is synchronized to the speech that is uttered in a corresponding media program. In other embodiments, however, the caption transcript(s) may not be synced. For example, in some embodiments, the corresponding media program may not immediately be available for syncing the caption transcripts to, and the caption transcripts may therefore be provided to the automated extraction and analysis module 102 and/or to the manual extraction and analysis module 104 in an unsynced format.

The caption transcript(s) provided to the automated extraction and analysis module 102 and/or to the manual extraction and analysis module 104 may in some cases include metadata or metatags embedded within or appended to the caption transcript, as described below.

The automated extraction and analysis module 102 and/or the manual extraction and analysis module 104 may, based on the caption transcripts, divide a media program or the corresponding caption transcript(s) into one or more segments termed "clips" or "stories." For example, a news program may be divided into segments corresponding to different news stories, a sports game may be divided along quarters or halves of playing time, a movie may be divided by chapters, and so forth. The automated extraction and analysis module 102 and/or the manual extraction and analysis module 104 may create or edit metadata based on individual clips or stories, and/or may create or edit metadata based on entire media programs. For example, the automated extraction and analysis module 102 and/or the manual extraction and analysis module 104 may provide metadata corresponding to an entire newscast and/or may provide metadata corresponding to each of the individual stories within the newscast. The metadata corresponding to each of the individual stories within the newscast may be useful when the metadata archive 106 is searched for a news story because a search hit may be easier/quicker to find and may be more direct in that the search hit is for an individual story rather than an entire newscast. However, in some embodiments, it may be useful to have metadata provided that corresponds to an entire media program, and as such, the automated extraction and analysis module 102 and/or the manual extraction and analysis module 104 may provide such in addition to or in place of metadata corresponding to each of the individual clips or stories of a media program.

The division of the media program or the corresponding caption transcripts into one or more segments may be accomplished in several different fashions. For example, the caption transcript file for a specific media program may be divided into one or more subset caption transcript files corresponding to each of the clips or stories, and as explained below metadata may be provided for each of the divided files. Alternatively, or in addition to this, the original, complete transcript file may be retained, and a plurality of sets of metadata may be provided for the complete transcript file—for example, one set of metadata corresponding to the complete transcript file, and one set of metadata corresponding to each of the individual clips or stories within the complete transcript file.

The division of the media program or the corresponding caption transcript(s) into one or more segments by the automated extraction and analysis module 102 and/or the manual extraction and analysis module 104 (as well as the extraction and analysis described in more detail below) may be an iterative process. For example, the automated extraction and analysis module 102 may preliminarily divide a media program or corresponding transcript into one or more clips or stories, but may, after additional processing (as described in more detail below), change the division of the media program or corresponding transcript. Also, a user may, using the manual extraction and analysis module 104, manually change the preliminary division of the media program or corresponding transcript provided by the automated extraction and analysis module 102. For example, the automated extraction and analysis module 102 may preliminarily divide a media program or transcript into five different clips or stories, but a user reviewing the division may, using the manual extraction and analysis module 104, re-combine two of the clips or stories so that there are only four total clips or stories.

Also, although FIG. 1 illustrates the automated extraction and analysis module providing the initial metadata (including the clip or story breaks), in some embodiments, a user may, using the manual extraction and analysis module 104, manually divide a media program or corresponding transcript into the appropriate clips or stories before the media program or corresponding transcript is processed by the automated extraction and analysis module 102.

Furthermore, in some embodiments, metadata or metatags embedded within or appended to a media file or corresponding transcript may provide breaks for the division of the media file or corresponding transcript into one or more clips or stories. For example, if a football game includes metadata or metatags indicating the different quarters of the football game, the automated extraction and analysis module 102 and/or the manual extraction and analysis module 104 may use the metadata or metatags in dividing the media program or corresponding transcript.

Returning to FIG. 1, the automated extraction and analysis module 102 and/or the manual extraction and analysis module 104 may extract information such as data, words, phrases and so forth out of a caption transcript corresponding to a media program and/or individual clips or stories, and may analyze the content of the caption transcript (and in some embodiments, any relevant metadata or metatags) and/or individual clips or stories to provide metadata to be stored in the metadata archive 106 illustrated in FIG. 1.

Referring to the automated extraction and analysis module 102, in some embodiments an automated text mining or semantic analysis program may extract data, words and so forth from the caption transcript of a media program and/or from individual clips or stories, and may analyze the content of the corresponding transcript(s). One example of a text mining and semantic analysis program is AlchemyAPI™. Of course, many other suitable text mining and/or semantic analysis programs may be used in generating the metadata stored in the metadata archive 106 illustrated in FIG. 1. With reference to "extraction," the automated extraction and analysis module 102 may extract one or more places (e.g., city, state, country, etc.), entities (e.g., companies, industries, etc.), languages, people (e.g., individuals, celebrities, career types, etc.) events (e.g., natural disasters, historical events, etc.) mentioned or referred to in the caption transcript corresponding to either the entire media program and/or to individual clips or stories of the media program. With reference to "analysis," the automated extraction and analysis module 102 may provide one or more keywords, abstract ideas, concepts, and so forth based on to the caption transcript(s). In some embodiments, the keywords, abstract ideas, concepts, and the like may not be explicitly referenced in the caption transcript(s), but may be provided by the automated extraction and analysis module 102 based on the caption transcript. For example, if a caption transcript describes a mardi gras party, the automated extraction and analysis module 102 may provide a keyword such as "New Orleans," even though neither New Orleans or Louisiana are ever explicitly referenced in the caption transcript.

As described in more detail below with reference to FIG. 4, the result of the extraction and analysis of the caption transcripts may be provided as a series of lists in each of a plurality of categories. For example, the extraction and analysis may return a list of people mentioned in the transcript, a list of places (cities, states, countries, etc.) a list of keywords, a list of concepts, etc. This information may in turn be stored as metadata associated with a caption transcript and/or program.

Also as described in more detail below, with reference for example to FIGS. 5 and 6, many different other methods may be used to extract data from and/or analyze a caption transcript. These methods include automated methods (e.g., done in automated extraction and analysis module 102), manual methods (e.g., done in manual extraction and analysis module 104), and hybrid combinations of both methods.

As mentioned, the automated extraction and analysis module 102 may process an entire media program or its corresponding caption transcript in some embodiments, and/or may process individual clips or stories from a media program or corresponding transcript(s). Processing the entire media program or corresponding transcript may provide a higher-level view, and may provide more general information. Processing individual clips or stories, on the other hand, may provide more focused information, and may provide a closer examination of the clip or story. As mentioned, either or both of the entire media program or the individual clips or stories may be processed by the automated extraction and analysis module 102 and/or the manual extraction and analysis module 104.

The automated extraction and analysis module 102 may also or alternatively provide a concept map for a media program and/or for individual clips or stories. The concept map may include a timeline of concepts or key ideas discussed or described in the media program and/or the individual clips or stories. For example, if the media program is a recorded lecture, the concept map may generally follow the broad themes of the lecture. The concept map may include time or location references to the media program and/or to the corresponding caption transcript. For example, the concept map may include a reference that the first major topic is discussed from 0:0:0 to 0:15:30 in the media program, and that the second major topic is discussed from 0:15:31 to 0:26:15 in the media program. In some embodiments, the concept map may also refer to sub-topics discussed in the media program, or may include both broad concept topics and more narrow specific topics.

The automated extraction and analysis module 102 may further perform many different types of extraction and analysis on a media program or individual clips or stories. For example, the automated extraction and analysis module 102 may analyze the vocabulary and sentence structure and determine an intended audience for the media program or clip or story (e.g., children vs. adults), may determine a sentiment or mood of the speaker (e.g., positive outlook, negative resentment, etc.), may determine whether a media program or clip or story contains a specific type of information (e.g., confidential information), and so on and so forth. In general, the automated extraction and analysis module 102 may perform many different types of extraction and/or analysis.

In response to the extraction and/or analysis done by the automated extraction and analysis module 102 (and/or the manual extraction and analysis module 104), a set of metadata may be provided. The metadata may be one or more suitable formats, such as Extensible Markup Language (XML), JavaScript Object Notation (JSON), Resource Description Framework (RDF), and so forth. As described below, the metadata may be stored in a metadata archive 106 in any of a number of different formats, and may correspond to an entire media program, one or more individual clips or stories, or both.

Returning to FIG. 1, and as mentioned above, a manual extraction and analysis module 104 may be provided in addition to, or in place of an automated extraction and analysis module 102. Generally, the manual extraction and analysis module may be similar to the automated extraction and analysis module 102 and may include similar functionality, except that most or all of the determinations may be made manually by a user. For example, as noted above, the user may override the automated division of a media program into different clips or stories, or the user may divide a media program into different clips or stories first before the automated extraction and analysis module 102 processes the media program at all. The user may also in some embodiments review at least portions of the initial metadata provided by the automated extraction and analysis module 102 for correctness. For example, the user may review the keywords, phrases, and concepts for a particular clip or story to verify that no keywords, phrases, or concepts were omitted and/or to verify that all relevant keywords, phrases and concepts are included. When a user utilizes the manual extraction and analysis module 104 to improve the initial metadata provided by the manual extraction and analysis module 104, the resulting metadata may be called "curated" metadata. Alternatively, in systems without an automated extraction and analysis module 102, the manual extraction and analysis module 104 may be utilized by a user to provide some or all of the relevant data extracted and/or analyzed by the automated extraction and analysis module 102, and the metadata provided by the manual extraction and analysis module 104 may be provided directly to the metadata archive 106. In still other embodiments, specifically systems without a manual extraction and analysis module 104, the initial metadata provided by the automated extraction and analysis module 102 may be provided directly to the metadata archive 106.

The metadata archive 106 may receive the initial metadata, the curated metadata, the caption transcripts, and/or any other suitable information regarding the media program (which, as described above, may already have metadata or metatags associated with it) and corresponding caption transcript, individual clips or media programs and their corresponding caption transcript(s), and so forth. The metadata archive 106 may be programmed according to Structured Query Language (SQL), or any other suitable database protocol. The metadata from the automated extraction and analysis module 102 and/or the manual extraction and analysis module 104 may be stored in the metadata archive 106 alone, or may be associated (e.g., embedded, appended, linked to, etc.) with the corresponding media program, clip or story, or with the corresponding caption transcript. As described in more detail below, the metadata archive 106 may be used to find relevant media programs and/or relevant individual clips and stories, and may also be used for other purposes also described below. In some embodiments, the metadata archive 106 may include or be configured to operate in connection with a computer program or interface in order to allow one or more users to manage the metadata in the archive—for example to view caption transcripts and associated metadata, to edit or revise metadata, to research the metadata and transcripts (e.g., to find monetization ideas), and so forth.

The caption extraction and analysis system 100 shown in FIG. 1 and described herein may be used in near-real-time for "live" media programs, and/or may be used for previously recorded media programs. One embodiment of a method for using the metadata provided by the caption extraction and analysis system 100 shown in FIG. 1 for previously recorded media programs is shown and described with reference to FIG. 2, and one embodiment of a method for using the metadata provided by the caption extraction and analysis system 100 shown in FIG. 1 for live media programs is shown and described with reference to FIG. 3. Of course, many suitable methods may be used in connection with the caption extraction and analysis system 100 shown in FIG. 1, and the methods described with reference to FIGS. 2 and 3 may be used with different embodiments of a caption extraction and analysis system 100.

Figure 2:
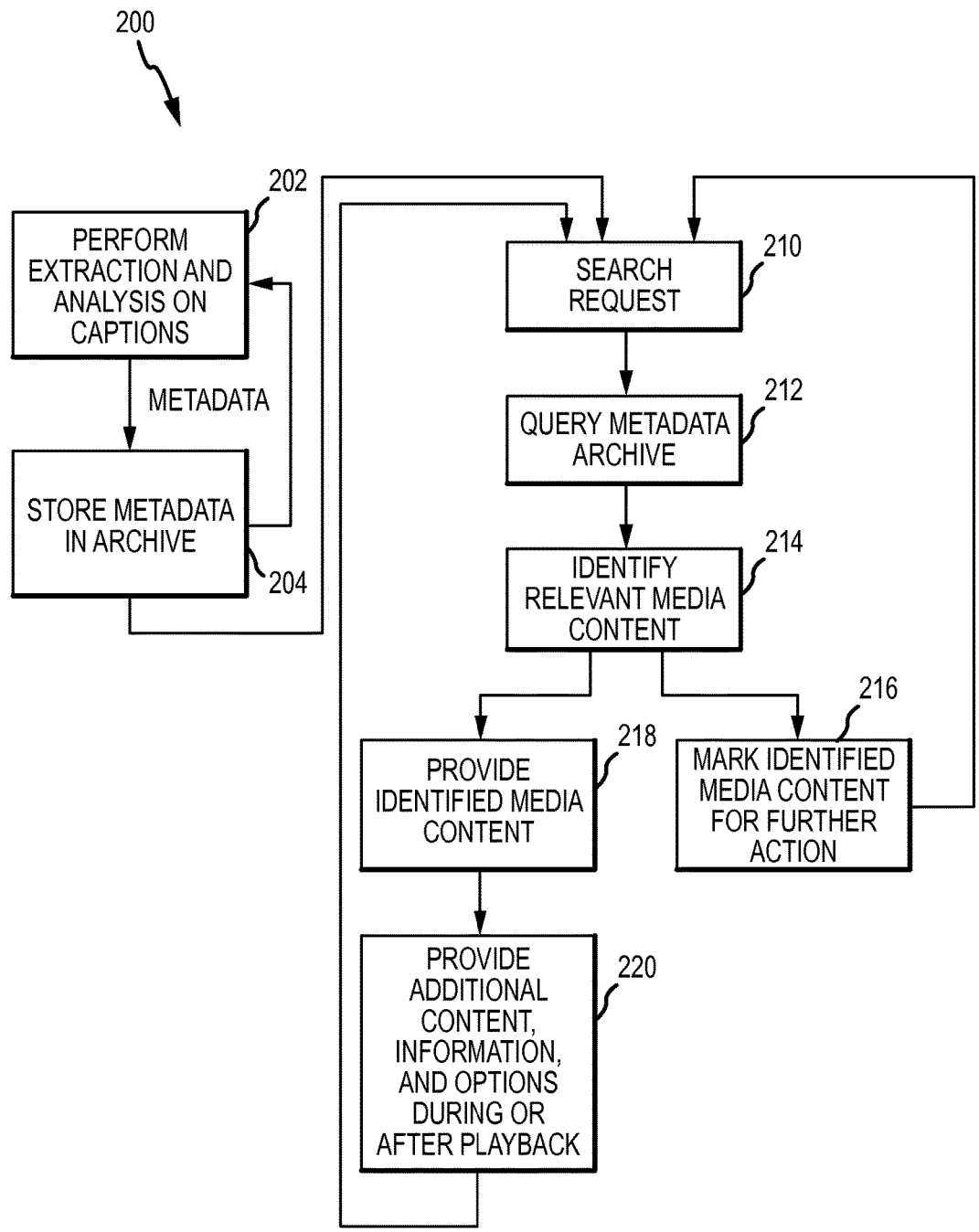
FIG. 2 is a flow diagram of a method for generating and using information provided by the caption extraction and analysis system shown in FIG. 1.

With reference now to FIG. 2, a method 200 for generating and using the metadata provided by the caption extraction and analysis system 100 shown in FIG. 1 will now be described. In a first operation 202, caption transcripts are provided to the automated extraction and analysis module 102 and/or to the manual extraction and analysis module 104, and in operation 204, the metadata provided in response is stored in the metadata archive 106. Operations 202 and 204 may be performed for each relevant media program and/or each individual clip or story of media program(s) for which a user desires to store associated metadata in the metadata archive 106 for subsequent searching. In some cases, operations 202 and 204 may be performed for a collection of caption transcripts, whereas in other cases operations 202 and 204 may be performed for individual caption transcripts shortly after a corresponding media program is completed, or even during an ongoing media program.

In operation 210 a search request may be made. The search request may be made by a person or an entity. For example, an end user of a media service may submit a search request for a video on a natural disaster. Another example of a person who may submit a search request may be a transcriptionist or captioner who is preparing or training to transcribe or caption an audio program—for example, a captioner who is preparing to provide captions for a technical program (e.g., financial planning, legal, etc.) may submit a search request for previous media programs relating to the topic, or previous media programs with similar hosts or speakers, and so forth.

Another example of an entity that may submit a search request is a content provider, such as a news station. The content provider may have years worth of media programs, and associated transcripts, and may be interested in archiving selected portions of the media programs, but not others. For example, a news provider may be interested in archiving news stories regarding political elections, but not be interested in archiving the daily weather or daily performance of financial indices. Submitting a search request may help the news provider cull and identify relevant stories for archival. In general, any different type of person or entity may submit a search request.

In operation 212, in response to the search request, the metadata archive 106 is queried. As described above, the metadata archive 106 may take one of several suitable formats or structures, and the format and structure of the archive 106 may determine how the query is submitted and what is received from the archive 106 in response. For example, if the metadata archive 106 also includes the full text caption transcripts for each of the media programs or individual clips or stories, a query to the metadata archive 106 may query not only the metadata provided by the automated extraction and analysis module 102 and/or the manual extraction and analysis module 104, but may also query the caption transcript(s) as well. Querying the metadata in the metadata archive 106 may provide an advantage over solely querying caption transcripts because the query may take less time to process, may be more accurate and reliable, may return better or more relevant results, and so forth, as mentioned above.

In response to the query to the metadata archive 106 from operation 212, in operation 214 relevant caption transcripts associated with a media program (or clip or story) and/or a media program (or clip or story) itself may be identified to the user or entity submitting the search request. The relevant caption transcripts and/or the relevant media program (or clip or story) may be identified in a playlist or any other suitable presentation that allows the user or entity to review the identified caption transcript, media program, clip or story, or any combination of these.

In operation 216, one or more of the identified caption transcripts or media programs or clips or stories may be marked for further action. For example, an entity desiring to archive select media programs may mark important media programs and/or clips or stories in order to be able to digitize the media programs and/or clips or stories, or in other cases in order to synchronize the caption transcript with the corresponding media program or clip or story.

Alternatively, in operation 218, one or more of the identified caption transcripts or media programs or clips or stories may be provided to a user. For example, a media program or clip or story associated with an identified caption transcript may be provided to the user to view. In some embodiments, such as those in which the caption transcript is synced to a media program or a clip or story, the media program or clip or story may be provided beginning at the relevant time within the media program or clip or story at which a particular topic, keyword, concept, word, and so forth is mentioned in the caption transcript. In other embodiments, whether or not the caption transcript is synced, the media program or clip or story may be provided at the beginning of the media program or clip or story.

During or after playback of the caption transcript or associated media program or clip or story, additional content, information, and/or options may be provided to the user in operation 220. A few examples of additional content, information, and/or options that may be provided include: related media programs (or clips or stories), maps, targeted ads, websites, resources such as online encyclopedias, and so forth. The additional content, information, and/or options may be based on the search request, the metadata archive 106 query, the keywords or concepts associated with the caption transcript or associated media program or clip or story, words spoken or images shown during the associated media program or clip or story, some combination of the above, and so forth. The additional content, information, and/or options may be provided in one or more different formats, including in a sidebar, a pop-up, a list or playlist, a picture, and so forth.

Figure 3:
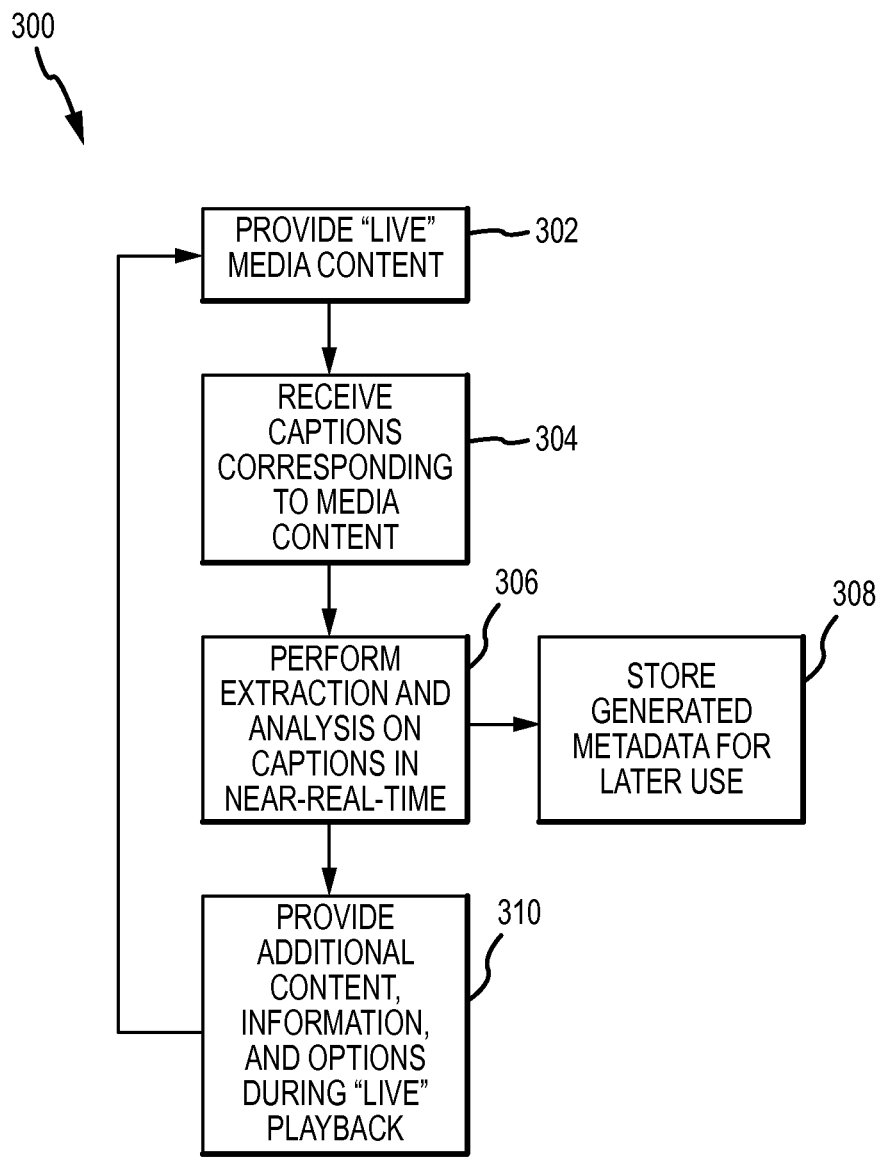
FIG. 3 is a flow diagram of another method for generating and using information provided by the caption extraction and analysis system shown in FIG. 1.

With reference now to FIG. 3, another method 300 for generating and using the metadata provided by the caption extraction and analysis system 100 shown in FIG. 1 and/or the captioning system of FIG. 8 will be described. In a first operation 302, "live" media content may be provided. In operation 304, caption transcript(s) corresponding to the media content may be received by the automated extraction and analysis module 102 and/or the manual extraction and analysis module 104. In operation 306, the automated extraction and analysis module 102 and/or the manual extraction and analysis module 104 may perform extraction and analysis of the caption transcript(s) in near-real-time. The metadata generated by the automated extraction and analysis module 102 and/or the manual extraction and analysis module 104 may be stored for later use in operation 308. Furthermore, in operation 310, additional content, information, and options may be provided during live playback of the media content, as described above in connection with previously recorded media programs.

As mentioned above and with reference now to FIG. 4, the extraction of information from and analysis of caption data in operations 202 and/or 306 may provide any of a number of different outputs. For example, FIG. 4 shows a table with different categories, and a list of people, places, keywords, and concepts gleaned from a particular caption using a text mining or semantic analysis program.

Figure 5:
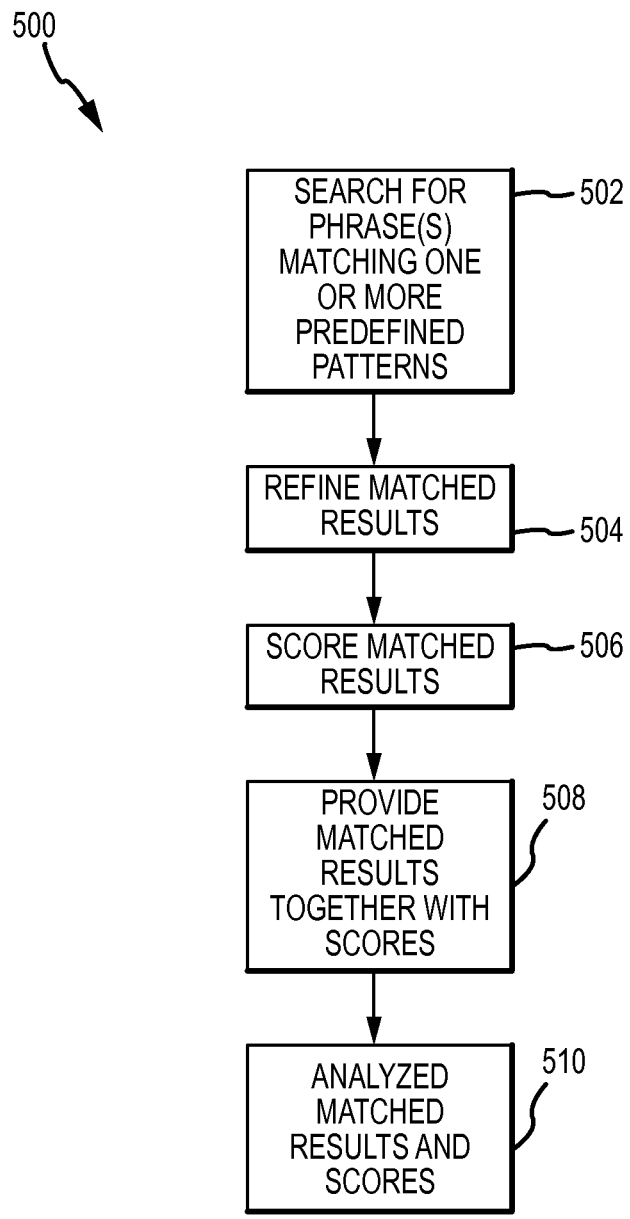
FIG. 5 is a flow diagram of a method for extracting key phrases from a caption transcript using the caption extraction and analysis system shown in FIG. 1.

Referring now to FIG. 5 in some embodiments, a key phrase extraction method 500 may be used in operations 202 and/or 306 in order to obtain metadata corresponding to a caption transcript. The method 500 illustrated in FIG. 5 may be similar to a data mining or semantic analysis program used to generate the data shown in FIG. 4, but the method 500 illustrated in FIG. 5 may be more custom tailored to identify relevant key phrases from typical caption transcripts. It will be appreciated that a "phrase" as used herein, includes constructs of a single word (i.e. one word phrases) as well as constructs of a plurality of words (i.e. multiple word phrases).

In operation 502, a caption transcript may be searched for one or more phrases matching one or more predefined patterns. The predefined patterns may be established before operation 502 begins, and may be established based on any of a number of factors.

The predefined patterns may include one or more types of patterns. One type of pattern may be a simple list of words and phrases—for example nouns and proper nouns. Another type of pattern may be a regular expression. For example, one regular expression pattern may include the word "Lake" followed by any of a plurality of different lake names. As another example of a regular expression pattern, variations on a single word (both "color" and "colour") may be encompassed by a pattern. Still other regular expressions may be designed in order to capture phrases that are common in spoken or written language for a particular type of media clip. For example, the words "charged with" may be particularly relevant in the context of news programs covering criminal activity. As such, a regular expression that takes a name or pronoun, followed by "charged with," followed by one of a list of different crimes (murder, robbery, assault, etc.) may form a regular expression pattern. These types of regular expressions may be automatically generated and/or may be manually created by a system operator who has familiarity with different phrases used in different contexts.

Another type of pattern may include an "exploded" term—which may be multiple variations on a word that all nonetheless may refer to the same thing. For example, Edward may be exploded to include Ed, Eddy, Eddie, Ted, Teddy, Ned, and so forth, or Katherine may be exploded to include Kathy, Kat, Katie, Katy, Kit, Kitty, Kate, and so forth.

Still another type of pattern may be based on strings of words that do not include one or more particular words, or in other words that searches for consecutive, non-trivial words. This type of pattern may be termed FREQ (for frequency), and may be used to extract phrases with 2 or more consecutive words that do not have any of a list of "stop words" intervening in the phrase. "Stop words" may be trivial words that have little to no probative value, such as of, the, in, a for, who, which, he, she, 1, 2, 3, 4, . . . , as well as other ambiguous terms. A FREQ pattern thus may match phrases that have consecutive words without any of these low value terms in the phrase.

Many other types of semantic-based, vocabulary-based, or experience-based patterns may similarly be used.

The predefined patterns may in some embodiments be categorized. Each predefined pattern may for example be associated with a primary category, and may optionally also be associated with one or more sub-categories. Primary categories may include for example phrases that answer the questions WHO (individual people, named groups, ethnicity, nationality, etc.), WHAT (action phrase, physical things, etc.), WHERE (city, state, country, other proper nouns designating locations, geographic features, regions, etc.), WHEN (date, time, holiday, season, etc.), and so forth. Other categories may include contact information (URL, phone number, address, etc.). Some categories may be defined based on the type of pattern used to detect a phrase—for example the FREQ patterns may all share a FREQ category. Other categories and/or subcategories may be subject matter based—for example crime, sports, business, politics, etc. In some examples, a pattern may be associated with a single category and/or subcategory, whereas in other embodiments, each pattern may be associated with a plurality of different categories and/or subcategories.

Returning to operation 502, the caption transcript may be searched for the one or more patterns in any of a variety of ways. For example, a comparison program may be used to try to find each and every predefined pattern in a plurality of subsets of the caption transcript. In other examples, a heuristic may be used to intelligently search for the one or more predefined patterns. Operation 502 may produce one or more matched results, which are phrases within the caption transcript that matched one or more patterns. The matched results generated in operation 502 may also include information about the pattern against which the phrase was matched, the location of the phrase within the caption transcript, whether the phrase appears more than once in the caption transcript, the categories/subcategories associated with the pattern against which the phrase was matched, and so forth.

This additional information, as well as the matched results themselves, may be used in operation 504 to help refine the matched results in some embodiments using, for example, the manual extraction and analysis module 102 described above. Certain matched results may be removed from the result list or combined with other results if, for example, they are repetitive or closely similar to other matched results. For example, the phrase "4th of July" may be combined with the phrase "Independence Day," both of which may be categorized as a time, and more specifically as a holiday. Furthermore, in operation 504 one or more matched results may be removed depending on the categories associated with the matched results. For example, if many or most of the matched results are categorized under crime, but one matched result is categorized as a restaurant, then the matched result associated with the restaurant category may be disregarded as perhaps not centrally relevant to the story at hand.

In operation 506, each of the (remaining) matched results is scored. The score given to each of the matched results may take into consideration one or more of a plurality of factors, and may indicate the possible relevance of the matched phrase. The score may be used, for example, to sort the matched results from a single transcript in order to identify the "most relevant" phrases from the caption transcript.

The score of a matched result may be based on one or more of: the (type of) pattern that was matched, the categories/subcategories associated with the pattern that was matched, the complexity of the pattern that was matched, the location where the phrase first appears in the transcript (closer to the beginning of the transcript may indicate greater importance), the length in words or characters of the phrase (longer phrases may indicate greater importance), the presence of absence of certain words or characters, the frequency with which the phrase is used in the transcript (multiple occurrences of a single phrase within a transcript may indicate greater importance), and so forth.

In some embodiments, the score assigned to each of the matched results may vary depending on the type of program embodied in the caption transcript. For example, in a news program, words near certain buzzwords (e.g., developing, urgent, critical, emergency, alert, etc.) may be more important than words away from those buzzwords, and phrases near the beginning of the newscast may be more important than phrases in the middle or end of the newscast. In a sports program, on the other hand, the most important phrases may be located near certain events (touchdown, goal, etc.), or may be located towards the end of the program (overtime, final, commentator analysis following the game, etc.). In a comedy program, the most important phrases may be those that are repeated several times. In general, the scores allocated to the various key phrases found in operation 502 may vary depending on many different factors.

In operation 508, each of the matched results are provided to the system 100, and may be stored in the metadata archive 106 as being associated with a particular caption transcript. In some embodiments, the scores corresponding to each of the matched results is also provided and stored. In some embodiments, all of the matched results are provided or stored, whereas in other embodiments, only certain of the matched results are provided or stored (e.g., the 5 results with the highest relevance scores). As described below, in some embodiments, the most relevant results (e.g., those with the highest scores) may be provided in a list of keywords or phrases to a viewer of a video corresponding to the caption transcript.

In operation 510, the matched results and/or the caption transcript itself may be analyzed. The matched results may be analyzed in order to, for example, categorize the program associated with the caption transcript, or to provide additional information to a user. As just one example, if more than a certain threshold percentage of the matched results are from one category (e.g. Sports—basketball), then that transcript or underlying program may be categorized as a basketball game with a certain level of confidence.

FIG. 6 illustrates a sample listing of key phrases that may be obtained using the method 500 illustrated in FIG. 5 and described herein. The listing shown in the table of FIG. 6 may be obtained from extracting information from and analyzing the following example story:

"Hi, everybody. I'm Kyle Dyer. We start with a developing story from Lakewood. A body was found at an office building. Let's check in with Tarhonda Thomas who joins us live from the scene at West fourth and union. Is that right? Reporter: Yes, we are at fourth and union. That victim's body is still inside the building. Lakewood police are investigating this area. The building is closed. No one that works here can go inside. Let me show you the crime scene from a few moments ago. Police say they found the woman's body last night. A cleaning crew came in the building and they found the woman. They called 911. Police are not saying how she was killed, whether that was a gunshot or any other method. They are keeping a lot of things confidential. This is an active investigation. The police spokesperson for the Lakewood police department says there are a lot of things that only the person did this would know. They are trying to keep the investigation secure. They are saying the victim is a woman. She is Middle age. They are not confirming her identity because the family members don't know what happened. That is the reason why we are getting few details about exactly what is going on. But, word has spread to people that work in this building and they are unneared of about what has happened here. Take a listen. This is something in a nicer building you don't expect to happen. It makes you feel, when you leave a door unlocked for people to come in and out, as they walk in, what could they want or what will they do. Reporter: That is what people are wondering. We have seen them line up down the street asking questions. Police are going in and out of the building. They are getting dressed in their gear. The victim's body is still inside. They say if you saw anything in this area of fourth and union around 7:00 last night give them a call. They think this is a Homicide. There will be a suspect that they will be looking for. If you saw anything, heard anything or think you know anything, give Lakewood police a call. Kyle? All right, Tarhonda Thomas, thanks so much."

As can be seen in the table of FIG. 6, each of the key phrase matched results includes the text string that matched a pattern in operation 502, along with a type category, a word count for the phrase, a character location within the transcript, the number of occurrences in the transcript, and a score generated for that particular matched result. It will be understood that many variations are possible—for example the length which is shown as word count in FIG. 6 may alternately be calculated as a character count, and the character location shown in FIG. 6 may alternately be a word location. Similarly, as described above, the scores shown in FIG. 6 are merely illustrative of one type of scoring system that may be used.

Figure 7:
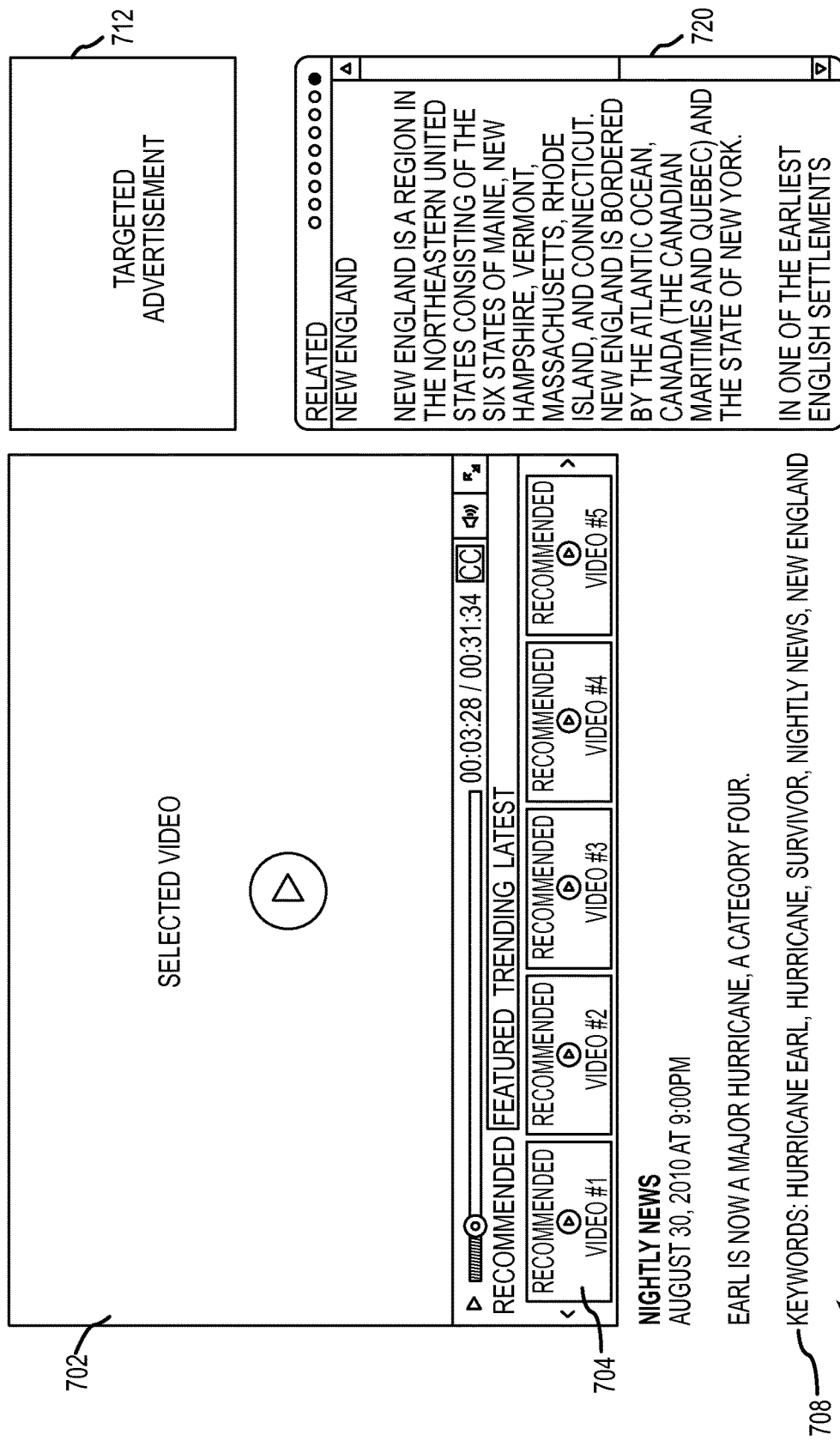
FIG. 7 is a screenshot of a computer implemented program for presenting information generated by the caption extraction and analysis system shown in FIG. 1.

With reference now to FIG. 7, a screenshot 700 of a computer implemented program for using information provided by the caption extraction and analysis system 100 is shown. The screenshot 700 may correspond to one or more of operations 218, 220, 302, 310, and so forth, as described above. For example, the screenshot 700 includes a window 702 in which a selected video may be played. The screenshot 700 also illustrates a plurality of recommended videos 704 which may be presented to a user—and the recommendations may be based on the recommended videos 704 having similar or overlapping key words or phrases as the currently selected video 702. The screenshot 700 also illustrates a listing 708 of keywords or key phrases, which may be the keywords or key phrases extracted from a caption transcript in operations 202, 306, or in any of the operations in method 500. The screenshot 700 also illustrates additional information, such as a targeted advertisement 712 (which may be based on the extracted and analyzed information from the caption transcript of the currently selected video 702 as described above), and an online encyclopedia entry 720 for one of the keywords or key phrases from listing 708. It will be understood that the screenshot 700 shown in FIG. 7 is merely illustrative of some of the options that may be possible using the metadata generated by the caption extraction and analysis system 100 using the methods 200, 300, 500 illustrated and described herein, and that the metadata may be used in many other ways as well.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claim(s) present elements of the various steps in a sample order, and are not necessarily meant to be limited to the specific order or hierarchy presented. Furthermore, in the various methods 200, 300, 500 described herein, some operations may be optional—as just one example, operation 504 may be skipped in method 500 in some embodiments, as may option 510. In general, unless otherwise noted, the operations described herein may be rearranged and/or skipped.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

While the present disclosure has been described with reference to several embodiments, these embodiments are illustrative only, and the scope of the disclosure is not limited to them. Many variations, modifications, additions, and improvements are possible. More generally, embodiments in accordance with the present disclosure have been described in the context of particular embodiments. Functionality may be separated or combined in blocks differently in various embodiments of the disclosure or described with different terminology. These and other variations, modifications, additions, and improvements may fall within the scope of the disclosure.

Figure 9:
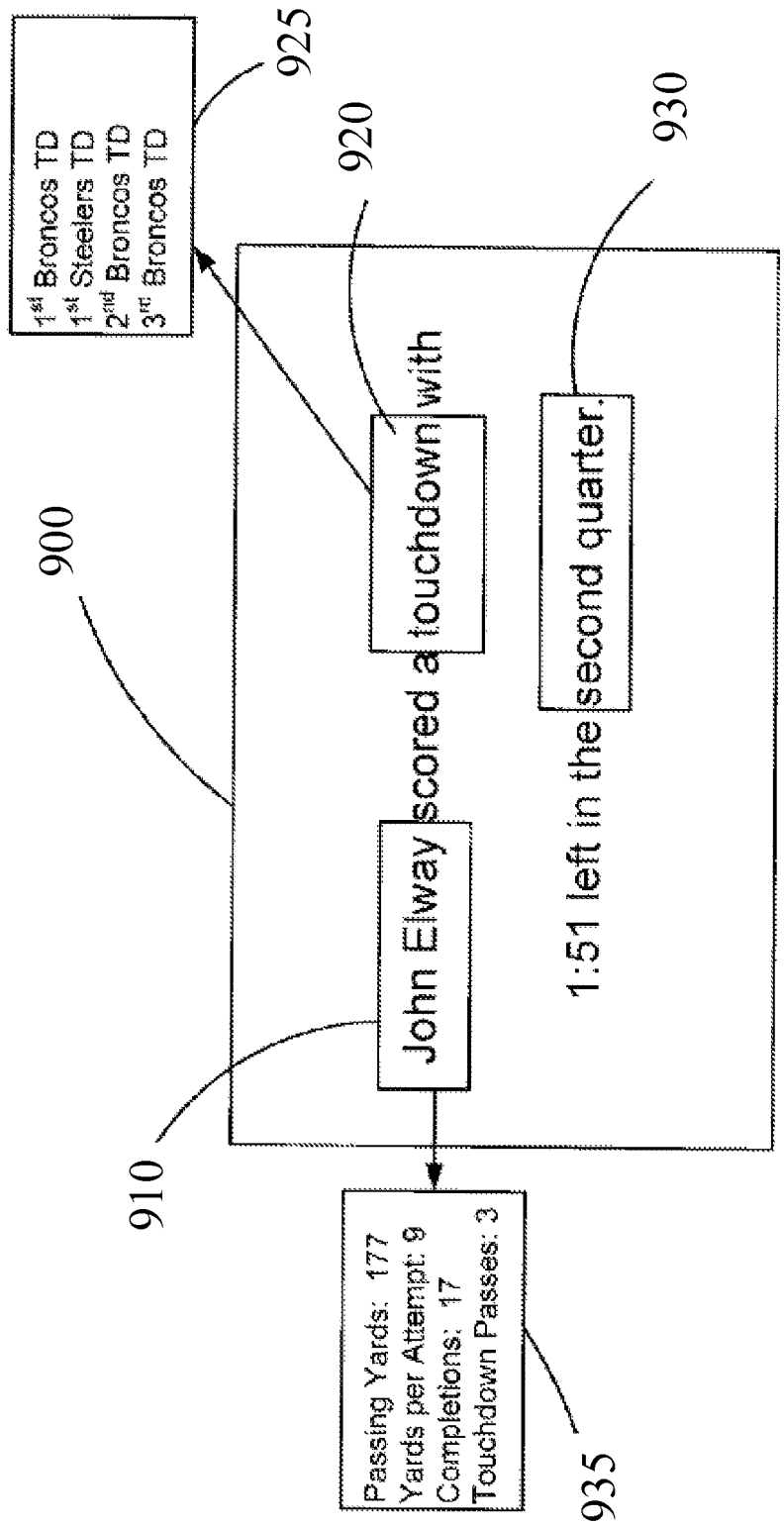
FIG. 9 depicts a sample caption with metatagged words and names.

FIG. 9 depicts a sample caption 900 that includes metatagged words 910, 920, 930. The metatagged words in FIG. 9 are enclosed in boxes for illustrative and explanatory purposes only and may be distinguished from regular text (text without metatags) in a caption as a different color, highlighted, underlined, as a different font and so on. In one example, the caption 900 may be from a captioned football game. The metatagged words 910, 920, 930 may provide different types of information to the user regarding the captioned event. For example, in FIG. 9, the metatagged name in box 910, "John Elway," may provide the user with John Elway's performance statistics for the captioned football game as shown in box 915. The metatagged word (e.g., metatagged text input) in box 920, "touchdown," may provide the user with a list of touchdowns that occurred during the captioned football game as shown in box 925, and the metatagged word 930, "second quarter," may allow the user to review the text and when selected, may direct the user back to the beginning of the text for the second quarter. Such information is generally retrieved from the archive site. Thus, a metatag may provide biographical, geographical, temporal or other information as appropriate based on the underlying word, term or phrase with which the metatag is associated. In certain embodiments, the information to which the metatag points may vary in the context of the overall captioning stream. As an example, a metatag for a sports player's name may lead to a statistical recap of the current game (at least through the time of the caption stream) while a game is being played. The metatag associated with that player's name may retrieve lifetime statistical information, a biography, current news and so forth when the metatag is used outside the context of an ongoing game. Thus, metatags and the information retrieved by the tags may be context-sensitive. Such adjustments may be made either by changing the metatag associated with a keystroke or changing the underlying database (or information in the database) to which the metatag points or from which information is retrieved.

In one example of FIG. 9, a user may be viewing the text 900 of the captioned football game on a handheld device and desire additional information regarding the touchdowns of the game. The user may select the metatagged text of box 920, which, as previously discussed, may be distinguished from the regular (unmetatagged) text in various ways such as different color text. For example, the metatagged text may appear as a link. The user may view selections such as those illustrated in box 925 and upon selection, may be directed to the corresponding text. More specifically, the user may select the option, "2nd Broncos TD," and may be directed to the text corresponding to the Broncos second touchdown of the captioned football game. After the user completes viewing the text of the desired portions of the football game, the user may return to the current, real-time text of the football game.

In an alternative embodiment, a user may be able to search the text of the captioned event as the captioned event takes place. For example, the user may enter the search term "John Elway" into a handheld device while viewing the text of a football game that is currently being played. Caption 900, metatagged text boxes 910, 920, 930 or any combination thereof, may be returned in the search results. Box 910 may be relevant to the search because the user searched the text input "John Elway," while box 920 may be relevant because John Elway may have participated in the touchdown play. Similar to box 920, box 930 also may be relevant as John Elway may have participated in the second quarter. In another example of this embodiment, the user may also search the text for events such as "touchdown in second quarter." In this example, the returned search results may be similar to the previous example. Thus, a user may retrieve captioning data as part of a search. Further, by selecting the captioning data result, the user may retrieve the caption data from the point at which the metatagged term occurs onward either as a streaming output or all at once (for example, as a text file). Alternatively, the user may retrieve the entirety of the caption file either with or without the metatagged term highlighted or otherwise emphasized.

CONCLUSION

Although the present invention has been described with respect to various embodiments, systems and processes herein, it will be appreciated by one of ordinary skill in the art that the embodiments, systems and/or processes may be changed without departing from the spirit or scope of the invention. For example, the archive system 850 may be multiple modules, each of which performs a separate function. Continuing the example, one module of the archive system may add time codes, while a second module may add metatags and a third module may index the video file and the caption file to one another. Accordingly, the proper scope of the invention is defined by the appended claims. The various embodiments, operations, components and configurations disclosed herein are generally exemplary rather than limiting in scope.

What is claimed is:

1. A method implemented in a computer system for providing related additional content in conjunction with a live media program, wherein the related additional content is identified from real-time closed caption data accompanying the live media program, the method comprising:
   receiving, in real time from a captioning system at an extraction and analysis module in the computer system, a caption transcript containing first metadata provided in substantially real-time relative to a live media program; wherein the extraction and analysis module further
      divides the caption transcript into one or more segments;
      extracts data, words, or phrases from the one or more segments of the caption transcript;
   creates second metadata from the extracted data words, or phrases;
      identifies respective related additional content related to the first metadata and the second metadata, respectively, wherein the related additional content is accessible over a communication network; and
      attaches respective links to the related additional content to the first metadata and the second metadata to associate the related additional content with the first metadata and the second metadata, respectively;
   storing the first metadata and the second metadata in a metadata archive, wherein the first metadata and the second metadata are associated with the caption transcript in the metadata archive; and
   transmitting the caption transcript with the associated first metadata and second metadata to the captioning system for broadcast transmission in conjunction with the live media program and presentation on a display system, wherein upon selection by a viewer of either or both of the first metadata and the second metadata presented during presentation of the live media event, the related additional content is accessible over the network for presentation on the display system to the viewer.

2. The method of claim 1, further comprising:
   receiving a request from a user device for particular media content by the extraction and analysis module;
   querying the metadata archive to identify relevant media content related to the request; and
   providing the media content to the user device.

3. The method of claim 2, wherein additional content is provided to the user device based on a search term used to query the metadata archive, a keyword associated with the identified, relevant media content provided to the user, or an event in the identified, relevant media content provided to the user device.

4. The method of claim 1, further comprising:
   analyzing the extract data, words, or phrases, or the caption transcript, within the extraction and analysis module to generate additional information related to at least portions or events within the live media program; and
   storing the additional information in the metadata archive; and
   transmitting the additional information to the captioning system for broadcast transmission in conjunction with the live media program and presentation on the display system.

5. The method of claim 1, wherein the second metadata includes relevance scores associated with one or more of the extracted data, words, or phrases extracted from the caption transcript.

6. The method of claim 1, wherein the caption transcript corresponds to only a portion of the media program.

7. A computer system for providing related additional content in conjunction with a live media program, wherein the related additional content is identified from real-time closed caption data accompanying the live media program, the computer system comprising:
   a captioning system configured to generate a caption transcript in real time corresponding to a live media program, wherein the caption transcript includes first metadata associated with media content provided in the live media program, wherein the first metadata is provided in substantially real-time relative to a live media program;
   an extraction and analysis module configured to
      receive the caption transcript corresponding to the media program,
      divide the caption transcript or media program into one or more segments,
      extract information from the one or more segments of the caption transcript,
      analyze the extracted information and create second metadata based on said extracting and analyzing;
      identify respective related additional content related to the first metadata and the second metadata, respectively, wherein the related additional content is accessible over a communication network; and
      attach respective links to the related additional content to the first metadata and the second metadata to associate the related additional content with the first metadata and the second metadata, respectively; and
   a metadata archive configured to store the first metadata provided by the captioning system and the second metadata provided by the extraction and analysis module; wherein
   the captioning system is further configured to output the caption transcript with the associated first metadata and second metadata for broadcast in conjunction with the live media program for presentation on a display system, and upon selection by a viewer of either or both of the first metadata and the second metadata presented during presentation of the live media event, the related additional content is accessible over the network for presentation on the display system to the viewer.

8. The system of claim 7, wherein the metadata archive is further configured to store the caption transcript.

9. The system of claim 7, wherein the computer system further comprises a manual editing module configured allow a user to edit the first metadata and the second metadata in the metadata archive.

10. A method implemented in a captioning system for providing related additional content in conjunction with a live media program, wherein the related additional content is identified from metadata associated with a caption transcript prepared in real time for the live media program, the method comprising:
   generating, using the captioning system, a caption transcript, wherein the caption transcript includes first metadata identified by a captioner during transcription of the live media program, wherein the first metadata is provided in substantially real-time relative to the live media program;
   searching, using the captioning system, the caption transcript for phrases matching one or more predefined patterns;
   scoring, using the captioning system, the matched phrases from the caption transcript as a function of their relevance within the caption transcript; and
   storing, using the captioning system, in a metadata archive the first metadata and at least some of the matched phrases and their corresponding scores as second metadata, each associated with the caption transcript;
   identifying, using the captioning system, respective related additional content related to the first metadata and the second metadata, respectively, wherein the related additional content is accessible over a communication network;
   attaching, using the captioning system, respective links to the related additional content to the first metadata and the second metadata to associate the related additional content with the first metadata and the second metadata, respectively; and
   outputting the caption transcript with the associated first metadata and second metadata for broadcast in conjunction with the live media program for presentation on a display system, wherein upon selection by a viewer of either or both of the first metadata and the second metadata presented during presentation of the live media event, the related additional content is accessible over the network for presentation on the display system to the viewer.

11. The method of claim 10, further comprising categorizing the caption transcript within the metadata archive as a function of the matched phrases.

12. The method of claim 10, wherein at least one of a group of the matched phrases is not stored in the metadata archive as second metadata as a result of the at least one matched phrase not being in a similar contextual category as a plurality of others of the group of the matched phrases.

13. The method of claim 10, wherein at least one of the predefined patterns comprises a pattern which searches for a desired frequency of consecutive words.

14. A method implemented in a computer system for providing related additional content in conjunction with a live media program, wherein the related additional content is identified from real-time closed caption data accompanying the live media program, the method comprising:
   receiving, in real time from a captioning system at an extraction and analysis module in the computer system, a caption transcript, wherein the extraction and analysis module further
      divides the caption transcript into one or more segments;
      extracts data, words, or phrases from the one or more segments of the caption transcript;
      creates metadata from the extracted data words, or phrases;
      identifies respective related additional content related to the metadata, wherein the related additional content is accessible over a communication network; and
      attaches respective links to the related additional content to the metadata to associate the related additional content with the metadata;
   storing the metadata in a metadata archive, wherein the metadata is associated with the caption transcript in the metadata archive; and
   transmitting the caption transcript with the associated metadata to the captioning system for broadcast transmission in conjunction with the live media program and presentation on a display system, wherein upon selection by a viewer of the metadata presented during presentation of the live media event, the related additional content is accessible over the network for presentation on the display system to the viewer.

15. A computer system for providing related additional content in conjunction with a live media program, wherein the related additional content is identified from real-time closed caption data accompanying the live media program, the computer system comprising:
a captioning system configured to generate a caption transcript in real time corresponding to a live media program;
an extraction and analysis module configured to
receive the caption transcript corresponding to the media program,
divide the caption transcript or media program into one or more segments,
extract information from the one or more segments of the caption transcript,
analyze the extracted information and create metadata based on the extracting and analyzing;
identify respective related additional content related to the metadata, wherein the related additional content is accessible over a communication network; and
attach respective links to the related additional content to the metadata to associate the related additional content with the metadata; and
a metadata archive configured to store the metadata provided by the extraction and analysis module; wherein
the captioning system is further configured to output the caption transcript with the associated metadata for broadcast in conjunction with the live media program for presentation on a display system and, upon selection by a viewer of the metadata presented during presentation of the live media event, the related additional content is accessible over the network for presentation on the display system to the viewer.

16. A method implemented in a captioning system for providing related additional content in conjunction with a live media program, wherein the related additional content is identified from metadata associated with a caption transcript prepared in real time for the live media program, the method comprising:
generating, using the captioning system, a caption transcript in substantially real-time relative to the live media program;
searching, using the captioning system, the caption transcript for phrases matching one or more predefined patterns;
scoring, using the captioning system, the matched phrases from the caption transcript as a function of their relevance within the caption transcript; and
storing, using the captioning system, in a metadata archive at least some of the matched phrases and their corresponding scores as metadata associated with the caption transcript;
identifying, using the captioning system, respective related additional content related to the metadata, wherein the related additional content is accessible over a communication network;
attaching, using the captioning system, respective links to the related additional content to the metadata to associate the related additional content with the metadata; and
outputting the caption transcript with the associated metadata for broadcast in conjunction with the live media program for presentation on a display system, wherein upon selection by a viewer of the metadata presented during presentation of the live media event, the related additional content is accessible over the network for presentation on the display system to the viewer.

* * * * *